(12) United States Patent
Panchaksharaiah et al.

(10) Patent No.: US 12,355,827 B2
(45) Date of Patent: *Jul. 8, 2025

(54) SYSTEMS AND METHODS FOR CREATING AND MANAGING BREAKOUT SESSIONS FOR A CONFERENCE SESSION

(71) Applicant: Adeia Guides Inc., San Jose, CA (US)

(72) Inventors: Vishwas Sharadanagar Panchaksharaiah, Karnataka (IN); Poovarasan Chitravel, Tamil Nadu (IN); Pawan Nagdeve, Bangalore (IN); Gudimetla Baby, Andhra Pradesh (IN); Sambeet Burma, Bangalore (IN); Gyanveer Singh, Bangalore (IN); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/106,241

(22) Filed: Feb. 6, 2023

(65) Prior Publication Data

US 2023/0199036 A1 Jun. 22, 2023

Related U.S. Application Data

(63) Continuation of application No. 17/555,114, filed on Dec. 17, 2021, now Pat. No. 11,601,480.

(51) Int. Cl.
*G06F 3/048* (2013.01)
*H04L 65/1083* (2022.01)
*H04L 65/403* (2022.01)

(52) U.S. Cl.
CPC ........ *H04L 65/1086* (2013.01); *H04L 65/403* (2013.01)

(58) Field of Classification Search
CPC ............... H04L 65/1086; H04L 65/403; H04L 65/1069

See application file for complete search history.

(56) References Cited

U.S. PATENT DOCUMENTS 8,600,025 B2   12/2013   Walsh et al.
9,420,108 B1   8/2016    Bostick et al.
(Continued)

OTHER PUBLICATIONS

"Intelligent Assistant for Group Chart, An IP.com Prior Art Database Disclosure", 2020.

(Continued)

*Primary Examiner* — Mohamed Abou El Seoud
(74) *Attorney, Agent, or Firm* — Haley Guiliano LLP

(57) ABSTRACT

Systems and methods for creating, monitoring, and managing a breakout conference for a conference call are disclosed. The methods determine topics for breakout rooms and their complexity scores. A breakout room is created for the topics, including separate breakout rooms for complex topics. An expertise score based on a plurality of factors for each device associated with a participant is also calculated. Devices are assigned to separate breakout rooms based on either just the expertise score or if the expertise score meets the threshold of the complexity score. Performance within the breakout rooms is displayed in real-time, such as in a graph. A moderator schedule is generated based the performance within the breakout rooms, where priority is given to a breakout room that has a negative performance over a breakout room with a positive performance.

20 Claims, 32 Drawing Sheets

(56) References Cited

U.S. PATENT DOCUMENTS

| | | |
|---|---|---|
| 10,007,721 B1 | 6/2018 | Klein et al. |
| 10,069,878 B1 | 9/2018 | Bastide et al. |
| 10,360,894 B1 | 7/2019 | Rakshit et al. |
| 10,608,968 B2 | 3/2020 | Higgins et al. |
| 10,692,516 B2 | 6/2020 | Bolsakovas et al. |
| 11,263,407 B1 | 3/2022 | Jawale et al. |
| 11,463,533 B1 | 10/2022 | Garber |
| 11,475,058 B1 | 10/2022 | Gupta et al. |
| 11,601,480 B1 | 3/2023 | Panchaksharaiah et al. |
| 11,856,145 B2 | 12/2023 | Panchaksharaiah et al. |
| 2003/0069867 A1 | 4/2003 | Coutts et al. |
| 2007/0299710 A1 | 12/2007 | Haveliwala |
| 2008/0260131 A1 | 10/2008 | Akesson |
| 2008/0307108 A1 | 12/2008 | Yan et al. |
| 2011/0150198 A1* | 6/2011 | Walsh ............... H04M 3/56 379/202.01 |
| 2011/0270609 A1 | 11/2011 | Jones et al. |
| 2013/0262453 A1 | 10/2013 | Lin et al. |
| 2014/0173467 A1 | 6/2014 | Clavel et al. |
| 2014/0267550 A1* | 9/2014 | Nimri ............... H04N 7/152 348/14.09 |
| 2017/0048392 A1 | 2/2017 | Bostick et al. |
| 2017/0048393 A1* | 2/2017 | Bostick ............... H04L 65/1093 |
| 2017/0099390 A1 | 4/2017 | Crowe et al. |
| 2018/0196796 A1 | 7/2018 | Wu |
| 2020/0036831 A1 | 1/2020 | Kim et al. |
| 2020/0057808 A1 | 2/2020 | Dunne et al. |
| 2020/0396191 A1 | 12/2020 | Yang |
| 2021/0158203 A1 | 5/2021 | Ganti et al. |
| 2021/0399911 A1 | 12/2021 | Jorasch et al. |
| 2022/0086393 A1* | 3/2022 | Peters ............... H04N 7/147 |
| 2022/0191055 A1 | 6/2022 | Christensen et al. |
| 2022/0207488 A1 | 6/2022 | Raje et al. |
| 2022/0294655 A1* | 9/2022 | Brickner ............. H04L 65/1093 |
| 2022/0303321 A1 | 9/2022 | Ostrand et al. |
| 2023/0007063 A1* | 1/2023 | Gupta ............... H04L 65/1069 |
| 2023/0199120 A1 | 6/2023 | Panchaksharaiah et al. |
| 2024/0031488 A1 | 1/2024 | Panchaksharaiah et al. |

OTHER PUBLICATIONS

U.S. Appl. No. 17/555,110, filed Dec. 17, 2021, Vishwas Sharadanagar Panchaksharaiah.

U.S. Appl. No. 18/376,640, filed Oct. 4, 2023, Vishwas Sharadanagar Panchaksharaiah.

* cited by examiner

| Topic | Office Party | Thermal Testing | Nuclear Fusion | Supplies for Thermal Testing | Testing Schedule | Marketing |
|---|---|---|---|---|---|---|
| Complexity Score | 2 | 6 | 10 | 5 | 4 | 6 |

| Context | John's Score |
|---|---|
| Administrative Tasks | 24 |
| Technical Analysis | 81 |
| Design Input | 73 |
| Product Testing | 74 |
| Employee Reviews | 38 |
| Management Tasks | 29 |
| Holiday Party Planning | 18 |
| Engagement in discussions | 71 |
| Activity during discussions | 78 |
| ••• | |
| Overall score | 68 |

- 1005
- 1010
- 1015
- 1020
- 1025
- 1030
- 1035
- 1040
- 1045
- 1050

| Technical Analysis | John's Score |
|---|---|
| Speaking time | 81 |
| Engagement | 73 |
| Sharing of documents | 74 |
| Providing Action Items | 38 |
| Ability to resolve issues | 29 |
| Fresh Ideas / Creativity | 64 |
| Responding to criticism | 21 |
| ... Other | |
| Overall Score for Technical Analysis | 81 |

| Relative to participants | John's Score |
|---|---|
| Overall Score | 68 |
| Mary | 88 |
| Michael | 79 |
| Robert | 42 |
| Employees in Lab Scheduling dept. | 45 |
| ••• | |
| Solu / CEO | 91 |

Main Conference

| User | Score wrt Context |
|---|---|
| James | 90 |
| Robert | 75 |
| John | 54 |
| Michael | 80 |
| William | 45 |
| David | 60 |
| Patricia | 95 |
| Jennifer | 68 |
| Linda | 71 |
| Elizabeth | 89 |
| Barbara | 41 |
| Susan | 50 |
| Jessica | 77 |

Breakout Conference

| Breakout Room-1 | Score wrt Context |
|---|---|
| James | 90 |
| David | 60 |
| William | 45 |
| *Avg score: 65* | |

| Breakout Room-2 | Score wrt Context |
|---|---|
| Patricia | 95 |
| Jennifer | 68 |
| Mary | 30 |
| Linda | 71 |
| *Avg score: 66* | |

| Breakout Room-3 | Score wrt Context |
|---|---|
| Michael | 80 |
| Jessica | 77 |
| Barbara | 41 |
| *Avg score: 66* | |

| Breakout Room-4 | Score wrt Context |
|---|---|
| Elizabeth | 89 |
| Robert | 75 |
| John | 54 |
| Susan | 50 |
| *Avg score: 67* | |

FIG. 19

Breakout Conference Room – Layout 1

<25% Spread

| Breakout Room 1 | Score | | Breakout Room 2 | Score | | Breakout Room 3 | Score |
|---|---|---|---|---|---|---|---|
| A1 | 67 | | B1 | 75 | | C1 | 73 |
| A2 | 61 | | B2 | 66 | | C2 | 77 |
| A3 | 82 | | B3 | 43 | | C3 | 47 |
| A4 | 77 | | B4 | 67 | | C4 | 38 |
| Total Score | 287 | | Total Score | 251 | | Total Score | 235 |

Breakout Conference Room – Layout 2

<5% Spread

| Breakout Room 1 | Score | | Breakout Room 2 | Score | | Breakout Room 3 | Score |
|---|---|---|---|---|---|---|---|
| A1 | 67 | | B1 | 75 | | C1 | 73 |
| A2 | 61 | | C2 | 77 | | B2 | 66 |
| C3 | 47 | | B3 | 43 | | C3 | 38 |
| A4 | 77 | | B4 | 67 | | A3 | 82 |
| Total Score | 252 | | Total Score | 262 | | Total Score | 259 |

FIG. 20

| Duration | Time Slot | Breakout Room |
|---|---|---|
| 10min | 2:15pm to 2:25pm | Breakout Room 1 (doing badly) |
| 2min | 2:25pm to 2:27pm | Breakout Room 4 (good) |
| 5 min | 2:28pm to 2:33pm | Breakout Room 3 (Average) |
| 7 min | 2:33pm to 2:40pm | Breakout Room 2 (Average) |

FIG. 32

SYSTEMS AND METHODS FOR CREATING AND MANAGING BREAKOUT SESSIONS FOR A CONFERENCE SESSION

CROSS-REFERENCE TO RELATED APPLICATIONS

This application is a continuation of U.S. patent application Ser. No. 17/555,114, filed Dec. 17, 2021. The disclosure of which is hereby incorporated by reference herein in its entirety.

FIELD OF INVENTION

Embodiments of the present disclosure relate to creating, monitoring, moderating, and managing breakout conference sessions for a main conference. They also relate to assigning devices to breakout sessions and automatically joining the assigned devices into and out of the breakout sessions.

BACKGROUND

Conference calls have become the backbone of a collaborative workplace, and when used properly, increase productivity and efficiency by allowing a group of individuals to discuss various topics and develop solutions for moving forward in their respective roles and projects. They are frequently used by individuals, groups, associations, government, educational institutions, and employees of various organizations. They are especially useful when the collaboration occurs among people who are geographically separated from one another and between employees that work remotely thereby alleviating or minimizing the need to meet physically for discussing a topic that can be discussed over a conference call. In more recent times, there has been an explosion of conference call activity, especially during the 2019-2021 years of the Covid-19 pandemic, during which a mass number of individuals worked from home or worked remotely and had the need to connect with their colleagues over a conference call to accomplish their job duties.

Although conference calling can be a useful mechanism to discuss various topics, unfortunately, there exist several issues with current conferencing methods that result in unproductive meetings, or in some instances, a waste of time. Since conference calling has become more easy and common through a variety of online conferencing options, such as Zoom™, Google Meet™, and Microsoft Teams™ individuals are spending more time than ever before on conference calls.

Some reasons for unproductive conferences include 1) incorrect or ad hoc assignments of participants in a main conference to a breakout room, 2) lack of tools to determine participant performance within the breakout room, 3) lack of monitoring or real-time visibility of performance within the breakout sessions, especially when there are multiple sessions concurrently being held at the same time, 4) creating of breakout rooms in blind, i.e., without adequate information on the number of breakout rooms needed and which topics to assign to which breakout room, 5) lack of conference tools to take corrective actions when progress within a breakout room is not being made or is inadequate, and 6) lack of tools to leverage prior data and utilize it for a successful meeting. These are just a few of a plethora of issues that are currently not addressed that result in inefficient meetings.

Another set of issues with current conferencing methods that result in unproductive meetings is the improper use of a moderator for the breakout rooms. Since there is little or no visibility for the moderator into the performance of the breakout room due to the moderator not being present in the breakout room, current methods do not have a method for properly, efficiently, and intelligibly using the moderator's time for the breakout rooms. The problem is compounded when there are several breakout rooms and only one or not enough moderators available for each room thereby resulting in improper or unproductive use of the moderator's time.

Yet another issue with current methods is that there are insufficient digital or online tools to keep the breakout room focused on the topic to be discussed. For example, in the main conference room, a topic or context may be assigned for brainstorming in the breakout room. Without moderator being in each breakout room all the time, each of which may have a different topic assigned for brainstorming, there are instances where brainstorming might drift away from the assigned context/topic. It is often required to bring the breakout room focus back on given context.

As such, there is a need for a better conferencing system and method to increase productivity during conference calls, intelligibly assign participants to breakout rooms, monitor the breakout rooms, based on performance data from the breakout rooms determine a moderator's schedule of attending breakout sessions in the breakout rooms, and provide tools that allow communication and management of the breakout room.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 9 is a table of complexity scores assigned based on the topic of breakout discussion, in accordance with some embodiments of the disclosure;

FIG. 11 is a table of a breakdown of scores for a specific topic of breakout session, in accordance with some embodiments of the disclosure;

FIG. 12 is a table of scores based on a participant's performance when in presence of another participant in the breakout session, in accordance with some embodiments of the disclosure;

FIG. 19 is an example block diagram assignment of participants breakout rooms and averaging across all breakout rooms, in accordance with some embodiments of the disclosure;

FIG. 20 is user interface depicting an initial breakout room assignment and a reshuffled assignment to average scores across all breakout rooms, in accordance with some embodiments of the disclosure;

FIG. 32 is an example moderator schedule generated based on the needs of plurality of breakout rooms, in accordance with some embodiments of the disclosure.

DETAILED DESCRIPTION

Figure 1:
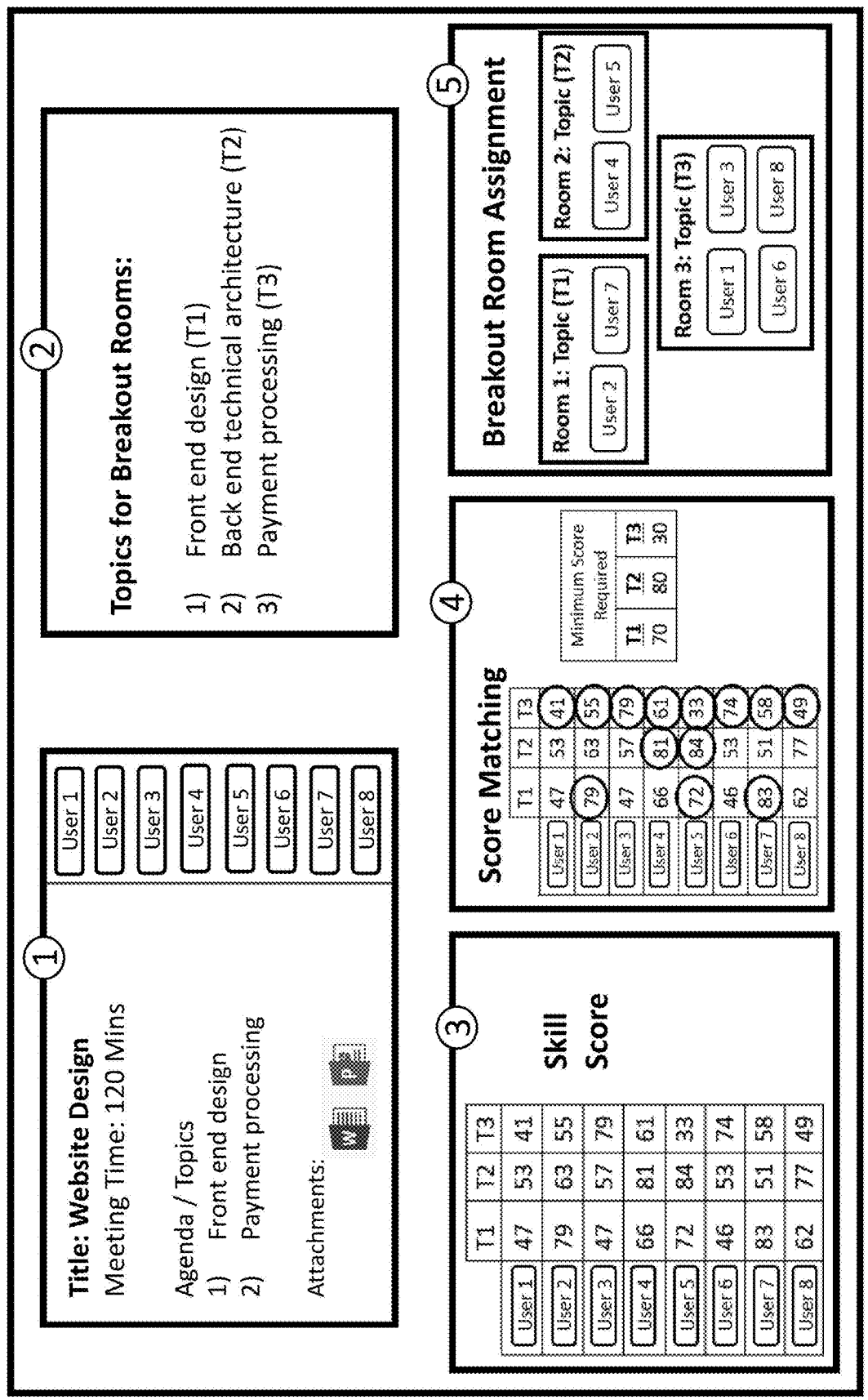
FIG. 1 is a block diagram of an example process for determining breakout room topics, determining topic and participant scores, and assigning participants to different breakout rooms, in accordance with some embodiments of the disclosure.

In accordance with some embodiments disclosed herein, the above-mentioned limitations are overcome by determining topics of discussion and determining breakout sessions based on the topics, automatically creating the breakout session(s) (also referred to as breakout room or breakout conference) for a main conference, assigning participants and a leader to each breakout session, selecting the participants and leader based on a plurality of scores and factors, automatically, or upon approval, joining the devices associated with the participants into the created breakout sessions, monitoring breakout room progress and health, generating a moderator schedule, and providing main conference and breakout conference tools for monitoring the heath of breakout rooms and taking corrective actions. The embodiments also utilize natural language (NLP), machine learning, and artificial intelligence (AI) systems, modules, and algorithms. Such NLP and AI algorithms are trained based on data gathered and utilized in making breakout room assignments and determining success probability of a breakout room.

In one embodiment, the methods determine topics for a breakout session of a main conference session based on agenda of the main conference session or other factors, such as participant discussion and documents or emails exchanged prior or during the main conference session.

In one embodiment, the topics are analyzed to generate a complexity score for each topic. A topic that deals with general matters which may not require a high level of skill receives a lower complexity score than a topic that requires a certain level of education or skill set for a participant to understand receives a higher complexity score.

In one embodiment, the complexity score may also be used in determining the number of breakout rooms that can be created. For example, a predetermined complexity threshold number, such as 55, 63, 80, or any other number, may be set by a user or the system for a topic of discussion that is to be had in the breakout room. If a topic for a breakout room exceeds the predetermined complexity threshold number, then the system may automatically designate a breakout room specifically for the discussion of such topic. Alternatively, the system may also create a breakout room for each topic, combine multiple topics into a single breakout room, or divide a single topic into multiple breakout rooms. Terms breakout room, breakout session, or brainstorming session are meant to be the same and used interchangeably throughout this document. Terms conference room, conference session, or main conference are meant to be the same and used interchangeably throughout this document.

The methods may also determine a score, also referred to as expertise score for each participant associated with the main conference. The expertise score, which is herein also referred to as participant score, knowledge score, skill set score, performance score, is based on a plurality of factors. These factors include prior performance of the participant in another main or breakout session, engagement and contributions of the participant during a breakout session, alertness and activeness, collaboration skills, the discussions of the participant during sessions and how closely the participant follows the context of the topic during breakout sessions, the participant's performance in the presence of another participant in the breakout session, the participant's knowledge, skill set, education, awards associated with the topic of discussion, and feedback received by the participant through surveys and polls. The score may dynamically change in real-time based on current performance of the participant in a breakout room.

In one embodiment, a topic may have a complexity score and a participant score may need to exceed the minimum complexity score for the participant to be assigned to a breakout room in which the topic is to be discussed. In another embodiment, the system may assign the participant a breakout room based on the participant's score in relation to the topic and not use the complexity score in such assignment determinations. In yet another embodiment, a mix of the complexity score and participant score may be factored to make the assignment determination.

In one embodiment, once the breakout rooms are created and a subset of devices, from the plurality of devices connected to the main conference session, are moved to the breakout rooms, either automatically or upon approval by a user associated with the device, the discussions through voice signals in the breakout rooms may be monitored.

In one embodiment, the system may cause for display a graph on a user interface of the moderator. The graph may reflect, in real-time, the performance within each breakout room. The performance may be measured based on a plurality of factors. For example, voice signals within each breakout room may be analyzed and keywords from the voice signals may be extracted to determine whether those keywords are within the context of a topic designated for discussion in the breakout room. If the discussion within the breakout room is within the context, then the graph is adjusted, and an upward or positive movement in the graph is displayed. On the flip side, if the discussions in the breakout room is diverting, swaying away, or out of context from the assigned topic of discussion, then a downward or negative movement in the graph is displayed. As such, performance may be measured with respect to how close the discussion in the breakout room follows the context of the topic.

In one embodiment, the real-time progress within each breakout room may be factored in to generate a moderator schedule for the moderator to join each of the breakout rooms. A breakout room that is not performing well, which may be indicated based on a negative graph, is assigned priority in the moderator schedule over a breakout room that is performing positively, which may be indicated by an upward movement in the graph.

In one embodiment, if the graph movement exceeds a predetermined acceleration threshold in a downward or negative manner, then the moderator schedule may be modified, and priority may be given to the breakout room whose graph exceeds the predetermined acceleration.

In another embodiment, the system may closely monitor the context or topics being discussed in main conference session before the breakout session has been created. In some instances, the system may use natural language processing to determine the context or topic being discussed. In other instances, the moderator or another participant may manually provide the context to system. Regardless of how the context and the topics are determined, they are used in determining the number of breakout rooms and participants to be assigned.

Once the breakout rooms are created, during the breakout room session, system actively and continuously monitors the room's discussion. The system may compare the discussion with given context and plot a continuous moving graph, such as a real-time graph, which projects how close or how far the discussion is happening with respect to given context. The graph may also measure how active or how silent the breakout room is. If the breakout room is silent, then, in one embodiment, the graph may plot the line away from context or in a downward manner.

The system may also cause for display a plurality of conferencing tools both on the user interface used by the participant as well as the user interface used by the moderator. For example, these conferencing tools may allow communications between different breakout rooms and communications between a breakout room and the main conference session. The conferencing tools may also allow the moderator to merge or split breakout rooms or move participants from one breakout room to another breakout room. The conferencing tools may also allow the moderator to gain deeper insights into the performance and activity of each participant.

In another embodiment, machine learning (ML) an artificial intelligence (AI) engines, systems, and/or algorithms may be used to analyze past performance of a participant and predict future performance in a conference session. Data that results from the ML and AI analysis may also be used in determining which participant to place/assign to which breakout room or which participant to pair, or not pair, with another participant.

FIG. 1 is a block diagram of an example process for determining breakout room topics, determining topic and participant scores, and assigning participants to different breakout rooms, in accordance with some embodiments of the disclosure.

Figure 3:
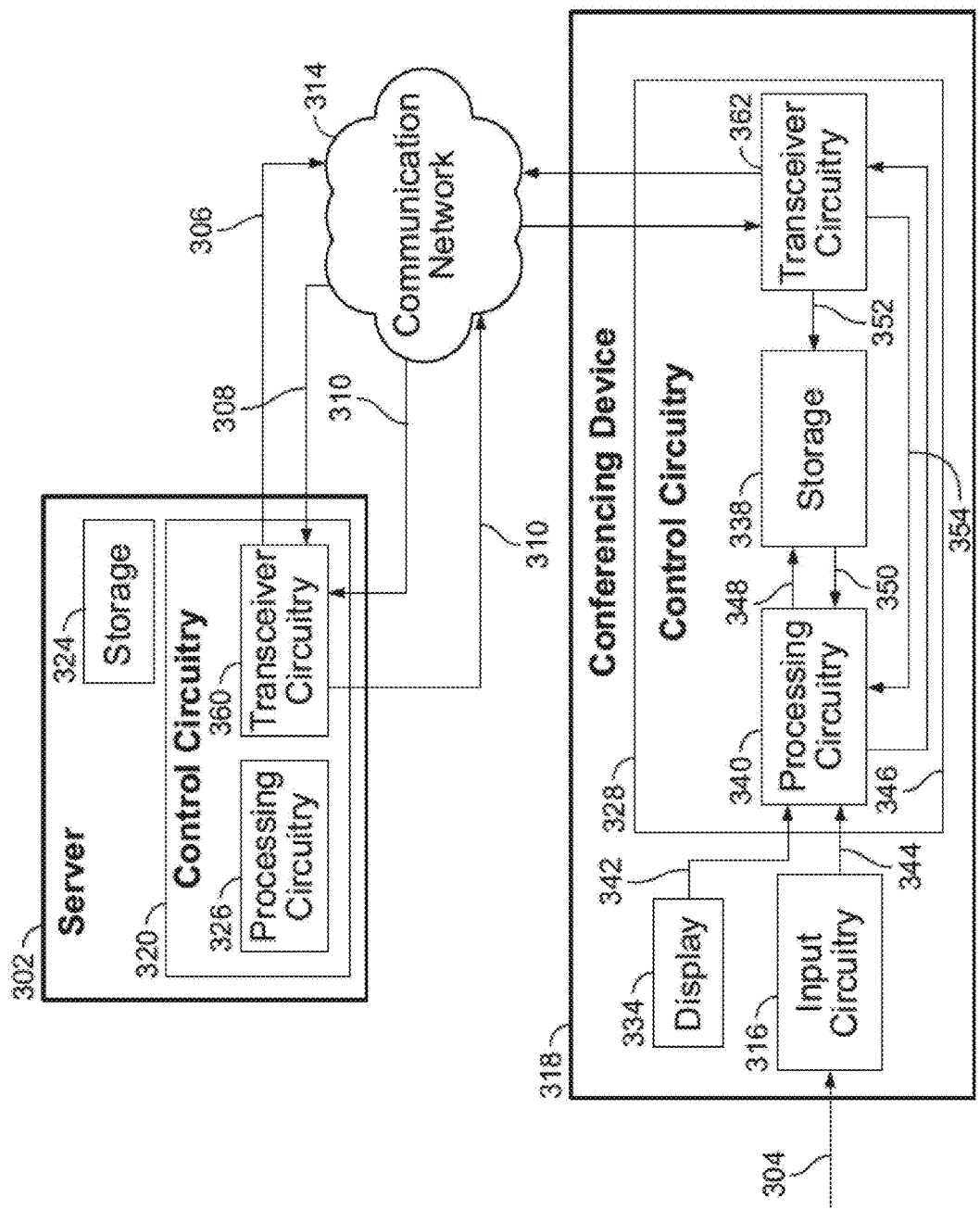
FIG. 3 is a block diagram of an example system for creating, monitoring, moderating, and managing breakout conference sessions for a main conference, in accordance with some embodiments of the disclosure.

In one embodiment, at block 1, a main conference session is accessed by a conference management system, such as the system displayed in FIG. 3. The conference management system accesses the agenda and topics of the main conference session and analyzes them to extract topics for breakout sessions. The conference management system also accesses profiles and other information of the users that are or will be attending the main conference session.

In one embodiment, the conference management system determines the topics by reviewing the agenda of the main conference session. In another embodiment the conference management system may access the attachments, such as the attachments depicted in block one, i.e., the Microsoft Word and PowerPoint documents, an analyze the text within those documents to determine the topics of the main conference session. In yet another embodiment, the conference management system may listen to audio output during the main conference for words spoken by the users to determine topics for the breakout room. The conference management system may also determine the topics of the main conference by accessing electronic devices of the users and other databases which may store interactions between the users relating to the main conference session. For example, the conference management system may access emails or texts between users of the main conference session, prior to the meeting, to determine topics that are relevant and/or will be discussed at the main conference session.

In another embodiment, at block 2, the system generates a list of topics that are to be discussed in breakout rooms. The system also analyzes the complexity of the topics in determining the number of breakout rooms that may be needed to discuss the generated topics. The system may also determine the number of participants needed based on the complexity of the topic, e.g., a complex topic may need more people offering different opinions to resolve a complex matter while a general topic may not need as many people and adding too many people may be less productive.

In one embodiment, the system may also generate a complexity score for each topic and use the complexity score in making decisions relating to breakout room creation and user assignments to the created breakout rooms. For example, the system may determine a complexity score threshold, such as 55, 70, 80, or some other number inputted by a user or the system. For each topic that exceeds the complexity threshold, the control circuitry may generate its own breakout session.

As depicted in block 2, the topics for the breakout room include 1) front end design, also referred to as topic 1 or T1 in FIG. 1, 2) back end technical architecture, also referred to as topic 2 or T2, and 3) payment processing, also referred to as topic 3 or T3. In one embodiment, topic 1 and topic 3 where generated based on the agenda of the main conference as depicted in block 1. The topic relating to back end technical architecture was generated, in one embodiment, by the system, based on the content inside the Microsoft Word and/or PowerPoint attachments.

In one embodiment, at block 3, the system may generate a skill score for each user of the main conference with respect to the topics for the breakout room. The skill score may be calculated based on a plurality of factors. These factors include the users previous conference history in which the user may have discussed the same or similar topics as those currently determined for the breakout rooms. The factors may also include the user's knowledge level, education, expertise, and other know how. The factors may also include how other people in the company where the user works, perceive the user's performance, knowledge, or skill with respect to certain topics and may also include polls, surveys, and recommendations provided by other users that have previously worked with the user whose skill score is being calculated.

As depicted in block 3, user 1 has received a score of 47 with respect to topic 1 (T1), a score of 53 with respect to topic 2 (T2), and a score of 41 with respect to topic 3 (T3). Likewise, user 2 has received a score of 79 with respect to topic 1 (T1), a score of 63 with respect to topic 2 (T2), and a score of 55 with a respected topic 3 (T3). The system may compile these scores and store into a database. The scores may be updated dynamically based on the users continuously changing skill set and performances in conference sessions. For example, the user performing well in a previous conference may get a high rating or score from their colleagues thereby resulting in the user's skill score with respect to the topic being increased. In another embodiment, the system may monitor the user's performance during a conference session or a breakout conference session to determine if the user stays on topic. The system may also determine if the user's discussions lead to successful outcome for the meeting, where success may be defined by assigning action items to team members or checking off or closing open items. Success may also be defined by team members agreeing on next steps of resolving an issue. The system may then dynamically adjust the user's score based on the above-mentioned monitoring.

At block 4, in one embodiment, the user's skill score may be compared against the complexity score for the topic designated for the breakout session. The complexity score may be the minimum skill score required to understand the topic. In one embodiment, if the user skill score does not meet the minimum complexity score set for a certain topic, then the system would not assign the user to a breakout room in which such topic will be discussed. In another embodiment, the system may not use the complexity score, and only the participant's general or topic specific knowledge/skill score, in determining placement of the participant in a breakout room.

As depicted in block 4, topic 1 (T1) has at minimum score requirement of 70, topic 2 (T2) has a minimum score requirement of 80, and topic 3 (T3) has a minimum score requirement of 30. Since users 2, 5, and 7 all meet the minimum topic score requirement for topic 1 (T1), the system may potentially select any of the users 2, 5, and 7 to discuss topic 1 (T1) in a breakout room. Likewise, topic 2 (T2) has a minimum score requirement of 80 and users 4 and 5 meet the set minimum requirements. As such, the system may determine that users 4 and 5 are qualified to discuss topic 2 (T2) and may select them for a breakout session to discuss the topic 2 (T2). Since topic 3 has the lowest minimum score requirement of all the three topics, which is a score of 30, potentially all users from the main conference room may be eligible and selected by the system to discuss topic 3 (T3) in a breakout session.

The system may consider a plurality of factors to further select users that meet the minimum score requirement for the breakout session in the breakout room. As depicted in block 5, in one embodiment, the system selected users 2 and 7 for topic one (T1), users 4 and 5 for discussing topic two (T2) and users 1, 3, 6, and 8 for discussing topic three (T3). The system may select all of the eligible users that meet the minimum score to the breakout room or may further sub select based on additional factors.

The system may seamlessly move the users that it has designated for specific topics and breakout rooms to their breakout rooms. The move may be performed automatically or after the users agree to the move. The system may utilize components, such as those depicted in FIGS. 3 and 5, to automatically invoke all back end processes involved in creating links as well as the breakout sessions such that the system may seamlessly move the users, either automatically or upon approval, to the breakout session without user intervention requiring them to navigate several steps in moving to the breakout conference room.

Figure 2:
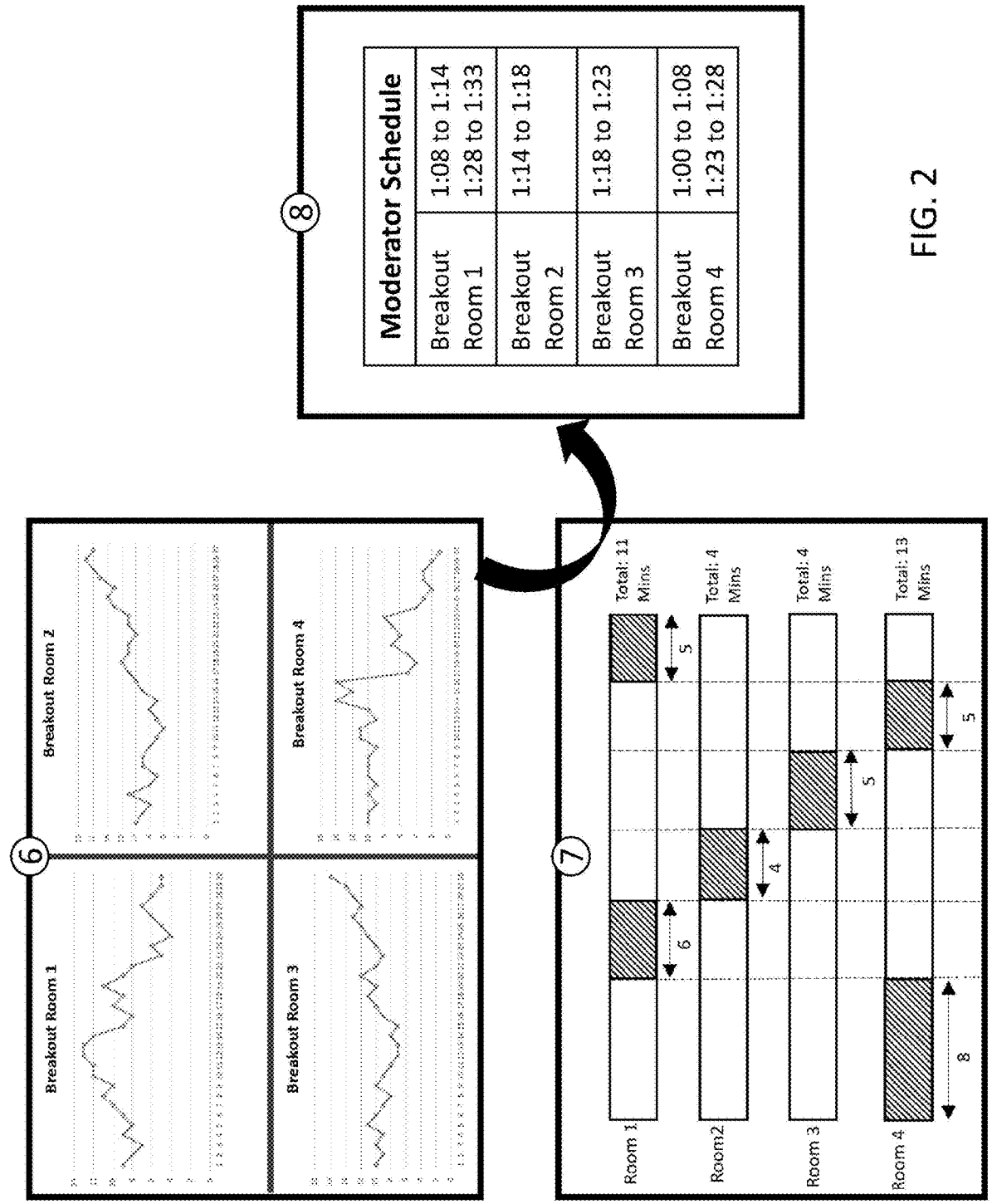
FIG. 2 is a block diagram of an example process for monitoring breakout rooms and generating a moderator schedule based on progress of the breakout room, in accordance with some embodiments of the disclosure.

FIG. 2 is a block diagram of an example process for monitoring breakout rooms and generating a moderator schedule based on progress of the breakout room, in accordance with some embodiments of the disclosure.

In one embodiment, once the breakout rooms have been created and the users moved to the breakout rooms, the system may provide monitoring tools to a moderator for monitoring each breakout room that is in active or in progress. As depicted in block 1, the progress being made within the breakout room may be charted in real-time on a dynamically moving graph. Although line graphs are depicted in FIG. 2, other graphs, pie charts, line drawings, or figures that provide real-time depiction of the progress being made are also contemplated.

The graph charted by the system may be based on a variety of factors that show progress within the breakout room. These factors may include a threshold factor to determine how close the discussions in the room are to the topic that is designated for discussion. For example, if the discussion in the room sways away or diverges from the designated topic, the real-time graph may show a downward move. Alternatively, if the discussion in the room stays on target and within the scope of the designated topic, then the graph would show an upward movement. Other factors for the upward and downward movement of the graph may include agreements and disagreements during discussions in the breakout room. They may also include instances in which the discussion is not moving along at the required pace.

At block 7, based on the real-time graphs displayed in block 6, which may be displayed on a user interface of a mobile phone, laptop, or desktop of the moderator, the system may determine a schedule for the moderator to join each of the breakout rooms in session. As depicted in block 7, the system has allotted a specific amount of time for each room breakout room and also generated a timeline that can be used in creating a schedule for the moderate.

At block 8, a moderator schedule may be displayed on the display of an electronic device associated with the moderator. The moderator schedule may be a dynamic schedule that changes in real-time or on periodic intervals as changes occur in the graphs relating to the breakout rooms. For example, if a graph undergoes a sudden drop of it the breakout room has an urgent need for a moderator, the system may alert the moderator and change the moderator's schedule to accommodate the sudden drop or the urgent need. The system may also receive a request from any one of the breakout rooms for the moderator and as such may change the moderator's schedule to accommodate the request.

In one embodiment, the system may provide a plurality of conference tools that may be used by the users as well as the moderator to communicate with each other. The user interface tools provided to the moderator may include reshuffling the users in a breakout room, such as moving a user from breakout room 1 to breakout room 4 on an as needed basis.

Figure 4:
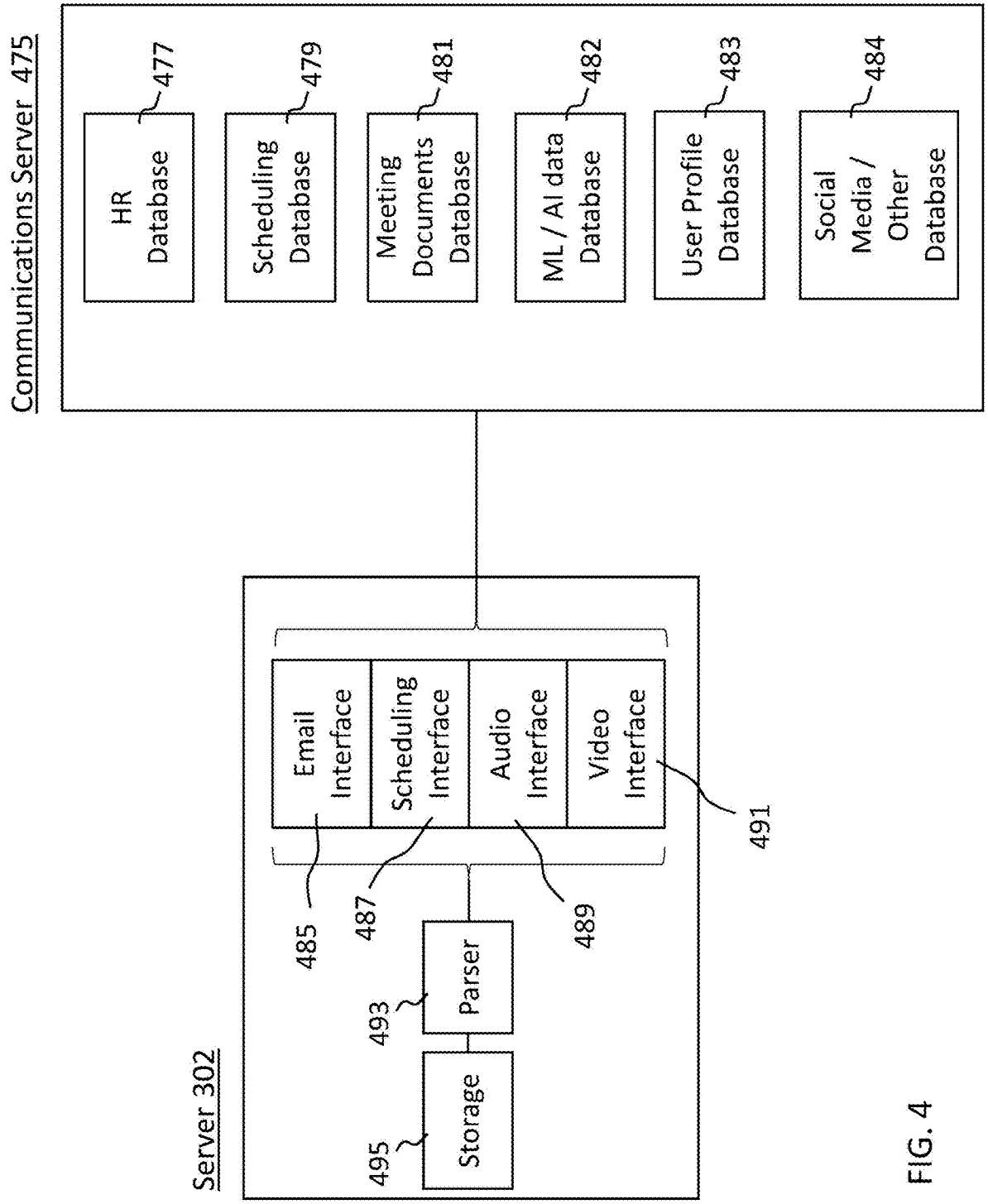
FIG. 4 is a block diagram of an example conference calling system, in accordance with some embodiments of the disclosure.
Figure 5:
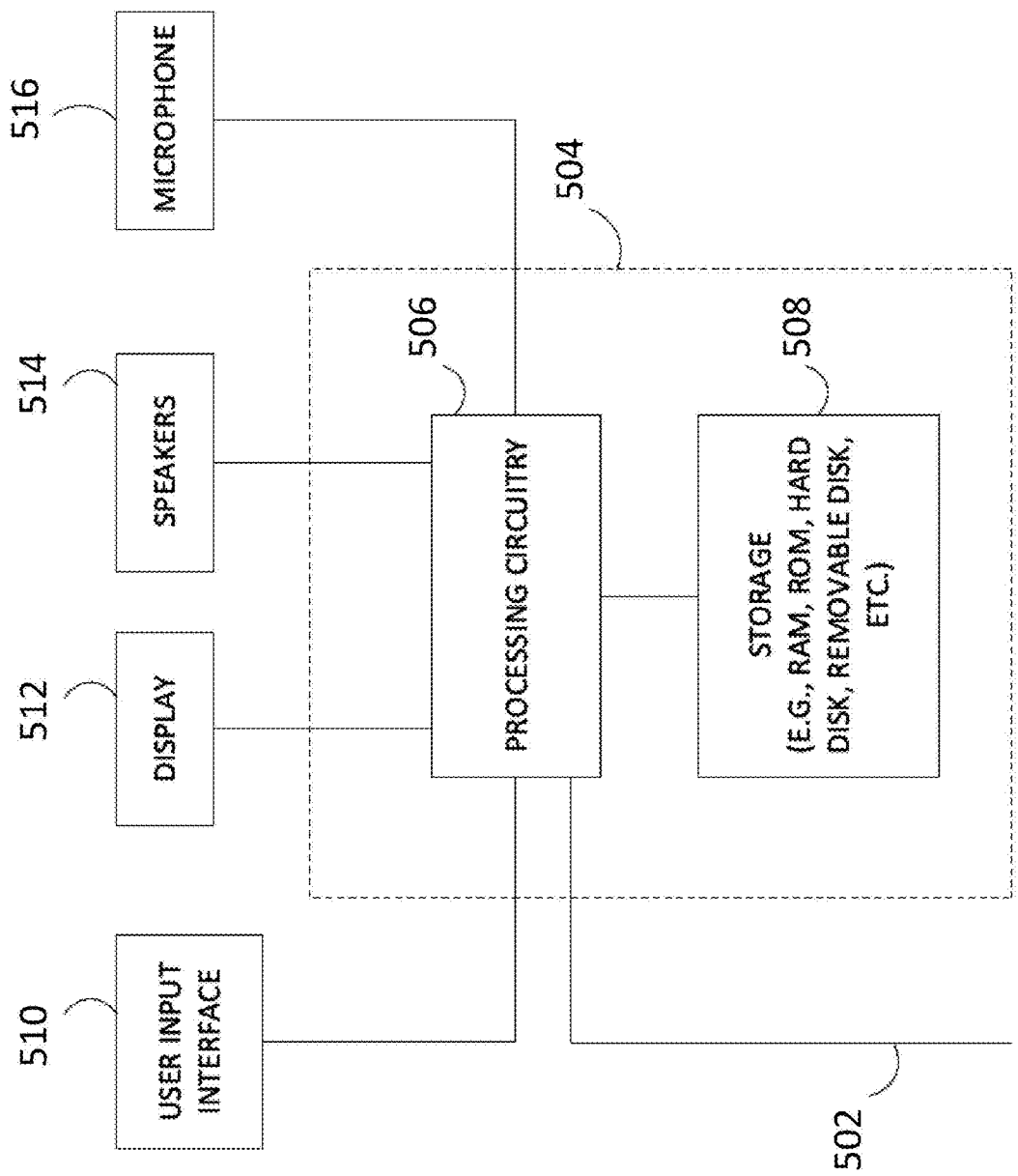
FIG. 5 is a block diagram of a conference device, in accordance with some embodiments of the disclosure.

The processes, functions, and the creation of breakout rooms, assignment of users to the breakout rooms, monitoring of the breakout rooms, and generating a schedule for the moderator to assist with the breakout rooms may be performed based on systems and devices as described and FIGS. 3-5.

FIG. 3 is a block diagram of an example system for creating, monitoring, managing, and taking corrective actions in a breakout room associated with a main conference, in accordance with some embodiments of the disclosure. In FIG. 3, an audio/video conferencing system 300 is configured, in accordance with some embodiments of the disclosure. In some embodiment, one or more parts of, or the entirety of system 300, may be configured as a system implementing various features, processes, functionalities, tables, scores, schedules, user interfaces, and components of FIGS. 6-32. Although FIG. 3 shows a certain number of components, in various examples, system 300 may include fewer than the illustrated number of components and/or multiples of one or more of the illustrated number of components.

System 300 is shown to include a computing device 318, a server 302 and a communication network 314. It is understood that while a single instance of a component may be shown and described relative to FIG. 3, additional instances of the component may be employed. For example, server 302 may include, or may be incorporated in, more than one server. Similarly, communication network 314 may include, or may be incorporated in, more than one communication network. Server 302 is shown communicatively coupled to computing device 318 through communication network 314. While not shown in FIG. 3, server 302 may be directly communicatively coupled to computing device 318, for example, in a system absent or bypassing communication network 314.

Communication network 314 may comprise one or more network systems, such as, without limitation, an Internet, LAN, WIFI or other network systems suitable for audio processing applications. In some embodiments, system 300 excludes server 302, and functionality that would otherwise be implemented by server 302 is instead implemented by other components of system 300, such as one or more components of communication network 314. In still other embodiments, server 302 works in conjunction with one or more components of communication network 314 to implement certain functionality described herein in a distributed or cooperative manner. Similarly, in some embodiments, system 300 excludes computing device 318, and functionality that would otherwise be implemented by computing device 318 is instead implemented by other components of system 300, such as one or more components of communication network 314 or server 302 or a combination. In still other embodiments, computing device 318 works in conjunction with one or more components of communication network 314 or server 302 to implement certain functionality described herein in a distributed or cooperative manner.

Computing device 318 includes control circuitry 328, display 334 and input circuitry 316. Control circuitry 328 in turn includes transceiver circuitry 362, storage 338 and processing circuitry 340. In some embodiments, computing device 318 or control circuitry 328 may be configured as media device 500 of FIG. 5.

Server 302 includes control circuitry 320 and storage 324. Each of storages 324 and 338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 324, 338 may be used to store various types of content, metadata, and or other types of data (e.g., they can be used to record audio questions asked by one or more participants connected to the conference. Non-volatile memory may also be used (e.g., to launch a boot-up routine and other instructions). Cloud-based storage may be used to supplement storages 324, 338 or instead of storages 324, 338. In some embodiments, the audio and/or video portion(s) of the breakout room session may be recorded and stored in one or more of storages 312, 338.

In some embodiments, control circuitry 320 and/or 328 executes instructions for an application stored in memory (e.g., storage 324 and/or storage 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an out-of-band feed, from an Internet resource, or using another suitable approach). Control circuitry 328 may retrieve instructions for the application from storage 338 and process the instructions to perform the functionality described herein. Based on the processed instructions, control circuitry 328 may determine a type of action to perform in response to input received from input circuitry 316 or from communication network 314. For example, in response to determining that a disagreement exists, the control circuitry 328 may perform the steps of process 700 (FIG. 7), process 2800 (FIG. 28), or functionality described with respects to FIGS. 1 and 2, and all the steps and processes described in all the figures depicted herein.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 328) and/or generate displays. Computing device 318 may receive the displays generated by the remote server and may display the content of the displays locally via display 334. This way, the processing of the instructions is performed remotely (e.g., by server 302) while the resulting displays, such as the display windows described elsewhere herein, are provided locally on computing device 318. Computing device 318 may receive inputs from the user via input circuitry 316 and transmit those inputs to the remote server for processing and generating the corresponding displays. Alternatively, computing device 318 may receive inputs from the user via input circuitry 316 and process and display the received inputs locally, by control circuitry 328 and display 334, respectively.

Figure 6:
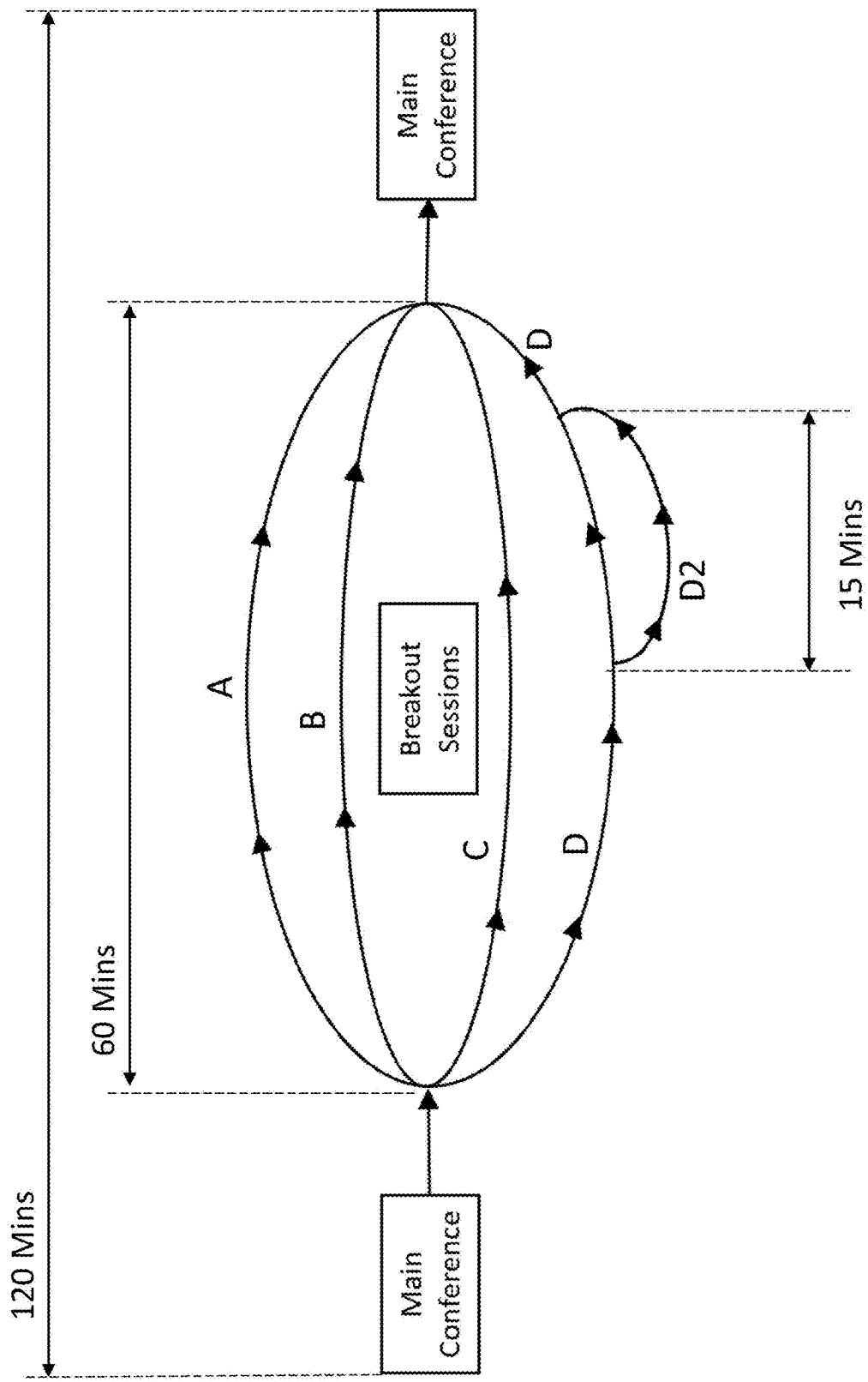
FIG. 6 is block diagram for an example conference call having a plurality of breakout sessions, in accordance with some embodiments of the disclosure.

Server 302 and computing device 318 may transmit and receive content and data such as breakout room participant data, breakout room health data, scores of participants, knowledge profile from stored databases, media content via communication network 314. For example, server 302 may be a conference provider, and computing device 318 may be a conference or client device configured to allow participants or moderator to join a conference, such as the main conference or breakout room as depicted in FIGS. 1, 6 and/or 16. Control circuitry 320, 328 may send and receive commands, requests, and other suitable data through communication network 314 using transceiver circuitry 360, 362, respectively. Control circuitry 320, 328 may communicate directly with each other using transceiver circuits 360, 362, respectively, avoiding communication network 314.

It is understood that computing device 318 is not limited to the embodiments and methods shown and described herein. In nonlimiting examples, computing device 318 may be a conferencing device, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a smartphone, or any other device, computing equipment, or wireless device, and/or combination of the same capable of suitably displaying and manipulating conference content.

Control circuitry 320 and/or 318 may be based on any suitable processing circuitry such as processing circuitry 326 and/or 340, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 318 are configured to implement a conferencing system, such as systems, or parts thereof, that perform various conferencing processes described and shown in connection with FIGS. 6-32 and/or systems carrying out the features described and shown relative to FIGS. 3 and 4.

Computing device 318 receives a user input 304 at input circuitry 316. For example, computing device 318 may receive a user input like room assignment, a user swipe or user touch to join a breakout room etc. In some embodiments, computing device 318 is a conference device with the capability to allow participants or moderator to join a breakout room. The computing device 318 may also provide meeting tools to the participants or the moderator while in the breakout room. It is understood that computing device 318 is not limited to the embodiments and methods shown and described herein. In nonlimiting examples, computing device 318 may be a personal computer (PC), a laptop computer, a tablet computer, a handheld computer, a stationary telephone, a personal digital assistant (PDA), a mobile telephone, a smartphone, or any other conferencing equipment, computing equipment, or wireless device, and/or combination of the same.

User input 304 may be received from a user selection-capturing interface that is separate from device 318, such as a remote-control device, trackpad or any other suitable user movement sensitive or capture devices, or as part of device 318, such as a touchscreen of display 334. Transmission of user input 304 to computing device 318 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 316 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 340 may receive input 304 from input circuit 316. Processing circuitry 340 may convert or translate the received user input 304 that may be in the form of voice input into a microphone, or movement or gestures to digital signals. In some embodiments, input circuit 316 performs the translation to digital signals. In some embodiments, processing circuitry 340 (or processing circuitry 326, as the case may be) carries out disclosed processes and methods. For example, processing circuitry 340 or processing circuitry 326 may perform processes 700 and 2800 of FIGS. 7 and 28, respectively.

FIG. 4 depicts, an example conference call system 470, in accordance with some embodiments of the disclosure. The system 470 includes server 302, as depicted in FIG. 3, and a communication server 475. The application server 302 and the communication server 475 include computer hardware as depicted in FIG. 3 to enable the storage and processing of conference related information across communications network 444, which includes LAN, WAN, and the Internet. In some embodiments, the server 302 and the communication server 475 may be virtual servers that run on the same computerized device, such as a single processor, a single memory, and a single network interface device.

The communication server 475 may be connected to a human resources (HR) database 477, a scheduling database 479, a meeting documents database 481, an ML/AI database 482 that stores data analyzed and collected by executing machine learning and artificial intelligence algorithms, a user profile database 483, social media database 484 and other databases storing information relating to the participant. The HR database 477 may comprise a profile of each employee of the company. The profile may include the employee, title, their job description, org chart which depicts all reports, managers and colleagues of the employee, groups to which the employee is connected, and any equipment, processes, job roles, and/or topics controlled by the employee for which the employee has decision making authority, employee education, employee degrees, employee reviews, positions held, departments worked for previously etc.

The scheduling database 479 may comprise a plurality of calendars and availability of systems, equipment, laboratories, and other services provided by the company. The calendar may show real-time availability for all services and processes controlled by the company. For example, if an employee needs to schedule the thermal testing lab during the week of November 10th, the control circuitry through the communication server may access the scheduling database and determine availability of the thermal testing lab during the November 10$^{th}$ week. If the employee is being sought out for breakout session that will be held on a scheduled date, the scheduling database may include information to determine the employee's availability.

The meeting documents database 481 may include meeting agenda, documents related to the meeting, emails, chats, and other communications relating to the meeting. The control circuitry through the communication server may access the meeting documents database 481 to obtain meeting agenda and schedule conference and breakout rooms. The communication circuitry may also access emails, chats, and any other documents exchanged prior to the meeting to determine the participants involved in the main conference and, based on the information available, may associate each participant with a particular topic of the agenda and experience with the topic. For example, if one of the topics of the main conference is augmented reality, and meeting documents circulated prior to meeting include John's email comments relating to Augmented Reality or any attachments, then the system may determine that John is knowledgeable in Augmented Reality systems and a breakout room that is focused on a discussion relating to Augmented Reality should include John.

The ML/AI database 482 may include data that has been collected and analyzed by executing ML and AI algorithms. For example, as will be described in further detail below, an ML algorithm may be executed to extract information relating to the participant's behavior in previous conferences or participant's past interactions through email, social media, and other sources. The ML algorithm may be used to determine a pattern based on such previous interactions and the data may be stored in the ML/AI database 482. The data collected may also be analyzed by the AI algorithm and stored in the ML/AI database 482. The control circuitry through the communication server may access the ML/AI database 482 to obtain participant data and use such data in determining whether the participant is qualified for a certain topic of the breakout session.

User profile database 483 may a profile that has been populated by the user, a human resources (HR) department or the system. This may include background information about the user/participant of the breakout room. Information such as prior experiences, accolades, expertise in a particular area, and any other information relevant to the employment may be populated in the user's profile and saved in the user profile database. The system may also use machine learning (ML) and artificial intelligence (AI) algorithms to mine and analyze data from previous meetings and interactions involving the user and store it in the user's profile. The control circuitry through the communication server may access the user profile database 483 to obtain the profile.

In some embodiments, social media database may include interactions of the user on various social media platforms. This may either be a single database that stores the information, or the system may need to access a separate database for each social media platform associated with the user. The user may need to authorize access by the system to social media databases associated with the user such that social media databases can be accessed and information that is relevant to the user's employment and topics of the conference or breakout session can be searched and obtained from such social media databases. The control circuitry through the communication server may access the social media database 484, such as Facebook™, Instagram™, or Twitter™, to obtain feeds and other information posted by the user on those platforms. For example, if one of the topics of the main conference is augmented reality, and the user has posted comments on social media relating to augmented realty, then such feeds, tweets, or posting will be accessed and analyzed to determine the user's proficiency in such subject matters. The proficiency may be compared to a topic agenda of the breakout session and used in determining whether the user is knowledgeable in the topic of the breakout room such that he/she may be assigned to the room.

In addition to the databases mentioned, other databases that include the user's interactions, documents, postings relevant to the topic of the breakout room or the conference room may also be accessed and analyzed to determine the user's knowledge and proficiency level such topics. For example, if the user is a member of a technical forum, such as the Institute of Electrical and Electronics Engineers (IEEE) and has spoken at the IEEE conferences or written papers, then accessing the IEEE system, the system may obtain relevant information to access the user's knowledge proficiency in the topic of the breakout room.

While in some embodiments each of the HR database 477, scheduling database 479, meeting documents database 481, user profile database 483, and social media database 484 are comprised by the communication server, in other embodiments, that one or all of the databases may be comprised by the server 302 or another server apart from the server 302, which may be an application server, and the communication server 475.

The server 302 may comprise an email interface 485, a scheduling interface 487, an audio interface 489, and a video interface 491. The email interface 485 may be configured to send and receive email communication from participants of the conference session, such as the main conference or breakout session described in FIGS. 1 and 2. The server 302 may further comprise a parser 493. The parser 493 may be in communication with the email interface 485 such that it may receive an email communication from a participant of the main conference or breakout session. The parser may be configured to extract information from the email received and provide it to the control circuitry of FIG. 5 for processing. For example, the parser 493 may extract meeting agenda from the email received and provide it to the control circuitry for creating and managing the main conference or breakout session. The information extracted by the parser 493 may be stored on local storage 495.

The scheduling interface 487 may be configured to receive calendar invites and other forms of scheduling data. The calendar interface 487 may be operable to receive and/or query a third-party calendar database to retrieve a calendar event. For example, the calendar interface 487 may be configured to interface with a Google™ Calendar application programming interface (API), a Microsoft Teams™ calendar API, and an Outlook™ calendar API. If a calendar invite is received, the scheduling interface 487 may provide to the parser 493 the scheduling details and any information comprised by the calendar such that the information can be passed onto and used by the control circuitry to schedule main conference or breakout session as needed.

The audio interface 487 may be configured to receive audio instructions to set up a meeting or speech during a main conference or breakout session. The audio interface may forward the speech and audio sounds to the parser such that they can be analyzed by the control circuitry and meeting related actions can be taken based on the content and context of the speech. For example, the control circuitry may analyze the speech using an artificial intelligence (AI) algorithm and determine two participants have expertise in a field, such as augmented reality, and that a breakout session concerning augmented reality should include the two participants. The audio information extracted by the parser 493 may be stored on local storage 495.

The video interface 489 may be configured to receive videos and images of participants during a conference and breakout sessions. The images and video data may be parsed by the parser and provided to the control circuitry such that meeting related actions can be taken based on the content and context of the images and video parsed. For example, the control circuitry may analyze the images and video, such as live video, using an artificial intelligence (AI) algorithm and determine that a first participant in the breakout session is interrupting a second participant and an alert should be sent to the breakout room such that the second participant may get a chance to provide their thoughts an opinion on the topic and not be overshadowed by the first participant. The video information extracted by the parser 493 may be stored on local storage 495.

FIG. 5 is a block diagram of a conference device, in accordance with some embodiments of the disclosure. In an embodiment, the conferencing device 500, is the same conferencing device 302 of FIG. 4. The conferencing device 500 may receive content and data via input/output (I/O) path 502. The I/O path 502 may provide audio content (e.g., speech input from a participant of the conference call) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The methods and processes involved in determining topics of discussion and determining breakout sessions based on the topics, automatically creating the breakout session(s) for a main conference, assigning participants and a leader to each breakout session, selecting the participants and leader based on a plurality of scores and factors, automatically, or upon approval, joining the devices associated with the participants into the created breakout sessions, monitoring breakout room progress and health, generating a moderator schedule, and providing main conference and breakout conference tools for monitoring the heath of breakout rooms and taking corrective actions, and related functions as described herein can be at least partially implemented using the control circuitry 504. In one embodiment, automatic refers to, performing the function without user intervention. The processes as described herein may be implemented in or supported by any suitable software, hardware, or combination thereof. They may also be implemented on servers, such as server 102 in FIG. 3, on remote servers, or across both.

In client-server-based embodiments, the control circuitry 504 may include communications circuitry suitable for communicating with one or more servers that may at least implement the storing of the all-conference and breakout room related information, such as meeting agendas, names and profiles of participants, recording of the main conference and breakout conference sessions, determining topics of discussion and determining breakout sessions based on the topics, automatically creating the breakout session(s) for a main conference, assigning participants and a leader to each breakout session, selecting the participants and leader based on a plurality of scores and factors, automatically, or upon user approval, joining the devices associated with the participants into the created breakout sessions, monitoring breakout room progress and health, generating a moderator schedule, and providing main conference and breakout conference tools for monitoring the heath of breakout rooms and taking corrective actions, generating closed caption transcripts of all breakout rooms discussions and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of conferencing devices, or communication of conferencing devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 508 may be used to store various types of content described herein, such as meeting agendas, breakout room topics, moderator schedules, names and profiles of participants, recording of the main and breakout conference sessions, prior meeting transcripts, participant scores, complexity ratings of topics of the breakout rooms, employee titles, job roles, and org charts, closed caption transcripts, and natural language (NLP), machine learning and artificial intelligence (AI) algorithms. Nonvolatile memory may also be used (e.g., to launch a boot-up routine and other instructions). Cloud-based storage, described in relation to FIG. 3, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the conferencing device 500. The control circuitry 504 may also include digital-to-analog converter circuitry and analog-to-digital converter circuitry for converting between digital and analog signals. The tuning and encoding circuitry may be used by the conferencing device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the conferencing device 500, the tuning and encoding circuitry (including multiple tuners) may be associated with the storage 508.

The user may utter instructions to the control circuitry 504, such as during a breakout session, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The conferencing device 500 may include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the conferencing device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active-matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of conferencing device 500 or may be a stand-alone unit. In some embodiments, the display 512 may be outputted through speaker 514.

The conferencing device 500 of FIG. 5 can be implemented in system 300 of FIG. 3 as conferencing device 118, but any other type of conferencing device suitable for determining topics of discussion and determining breakout sessions based on the topics, automatically creating the breakout session(s) for a main conference, assigning participants and a leader to each breakout session, selecting the participants and leader based on a plurality of scores and factors, automatically, or upon approval, joining the devices associated with the participants into the created breakout sessions, monitoring breakout room progress and health, generating a moderator schedule, and providing main conference and breakout conference tools for monitoring the heath of breakout rooms and taking corrective actions. For example, conferencing devices such as a laptop, mobile phone, electronic tablet or similar may be used. Conferencing devices may be part of a network of devices. Various network configurations of devices may be implemented and are discussed in more detail below.

FIG. 6 is block diagram of an example conference call having a main conference session and a plurality of breakout rooms/sessions, in accordance with some embodiments of the disclosure. In this embodiment, the main conference call session includes a total of four breakout rooms A, B, C, and D. In addition, breakout room D is depicted to be further split into breakout session D and sub-session D2 for a certain duration of time.

As depicted in FIG. 6, the main conference has been allotted a time of 120 minutes. Each of the breakout sessions A, B, C, and D have been allotted a total of 60 minutes. Breakout session D has been split into a second section D2 for 15 minutes. Although it is depicted that all breakout sessions have been allotted the same amount of time, the system may allow different amount of time for different breakout sessions as needed. The system may also lengthen or shorten the time of a breakout session based on a variety of factors, such as if the topic of discussion is completed or if additional time is needed.

As will be described in further detail below, any number of breakout rooms/sessions may be generated by the system based on the amount, type, and complexity of the topics that need to be discussed. The breakout sessions may be created automatically by the control circuitry. In one embodiment, control circuitry may automatically create the breakout session based on analysis performed by an artificial intelligence engine executing an AI algorithm, wherein automatic refers to, in one embodiment, performing the function without user intervention. The AI algorithm may be fed data, such as meeting agendas, discussions during the main conference session that suggest a breakout session, keywords uttered during the main conference session. The AI algorithm may also receive inputted data that indicates that a particular topic that is part of the main conference session is better suited for a breakout session or is a topic that requires further attention or expertise, requires grouping of certain participants for further discussion, such that the primary conferencing session proceed without delays, or be paused until the breakout session is completed and the participants have returned to the main conference session.

In some embodiments the main conference session call may have a presenter, a leader, or a moderator. In other embodiments there may be a plurality of participants and the main conference session may not have a designated presenter or moderator and it may be a meeting where several participants discuss a plurality of topics.

In some embodiments, the main conference call session may include a presenter. The presenter may lead the meeting and facilitate the discussion of topics in the agenda. The presenter may use an electronic device to manage the main conference session, to communicate with other participants, and select conferencing options available for the conference session.

As will be further explained later, the breakout rooms A, B, C, and D may be assigned specific participants from the main conference session. The participants may be reshuffled to other breakout rooms as needed. Breakout session D2, in one embodiment, may not be part of the initially created breakout sessions A, B, C, and D. The system may monitor the discussions and progress of each breakout session and determine a need to further split or merge some of the breakout sessions already in progress. Breakout session D2, is one such example of a second breakout session being generated for a smaller duration of time for participants of the initially created breakout session D.

In some embodiments, when the breakout sessions have ended, either based on the total time allotted, or ended earlier by the participants, the participants of the breakout session will be joined back automatically, or upon approval by the participants, and seamlessly into the main conference session. The participants may report their findings from the breakout session, or a transcript and summary may be provided an accessible two other attendees of the main conference session that were not part of the breakout session. In one embodiment, the process of assigning participants to a breakout session, such as any one of the breakout sessions A, B, C, or D is further described in FIG. 7.

Figure 7:
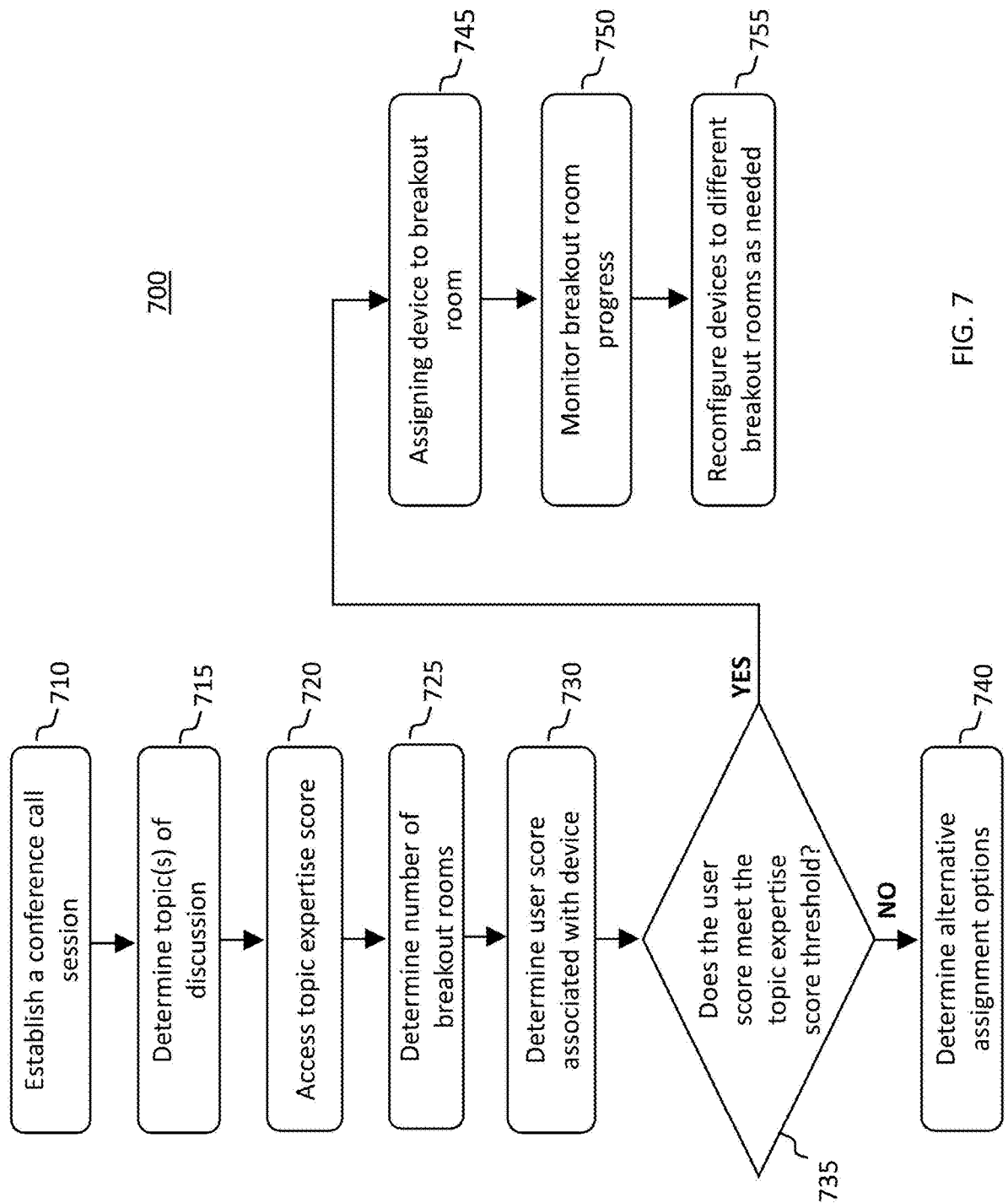
FIG. 7 is flowchart of a process for generating a breakout conference session for a main conference and assigning participants to the breakout session, in accordance with some embodiments of the disclosure.

FIG. 7 is a flow chart of a process for generating and managing breakout rooms, in accordance with some embodiments of the disclosure. The process 700 allows the system, such as system depicted in FIG. 3, to automatically generate a desired number of breakout rooms, seamlessly move participants to the generated breakout room, and then move them back into the main conference one the breakout session is completed, wherein automatic refers to, in one embodiment, performing the function without user intervention. Creating such breakout rooms allows a focused discussion to take place on a specific topic of the main conference session while the main conference session may continue without any disruptions. Additionally, the system may also generate a summary of the discussions, action items, and relevant data from the breakout sessions such that once everyone from the breakout session is merged back to the main conference session, a summary of what they brainstormed, discussed, or achieved in each breakout session may be useful to access for other participants of the main conference session that were not in the same breakout session. The summary may be accessed at any time and in real-time even when the breakout session is in progress. For example, a moderator entering a breakout room may want to get up to speed and may use the summary of the discussions had so far in the breakout room to catch up.

The process 700, in one embodiment, may begin at block 710 where the system establishes a conference call session. The main conference call session may be established based on host participant scheduling a conference call session in their calendar. They may also use online tools and virtual meeting platforms, such as Zoom™, Google Meet™, or Microsoft Teams™, to signal the system to establish the main conference session.

Regardless how the request for establishing the main conference call session is received, the system may establish the main conference call session and send links and confirmation to all the participants that are to attend the main conference session. In some embodiments, the system may also provide special links to a presenter. Moderator, or host of the main conference call session and provide them hosting tools.

At block 715 the system determines the topics of discussion in the main conference session. The topics of discussion and other conference details, such as title of the meeting and agenda may be obtained by the system from a plurality of sources. For example, a document containing meeting title and the topics of agenda may have been circulated to the participants of the meeting prior to or after establishing the main conference. The title and agenda may also be obtained through a scheduler, calendar, or a meeting invite that lists the title and the agenda of the main conference session. In some embodiments, the title and agenda may be uttered by one of the participants during the main conference call and the system, by applying natural language processing (NLP) algorithms and artificial intelligence (AI) algorithms may determine the topic and agenda based on analyzing the uttered speech. In another embodiment, a participant may request that a particular topic be discussed in additional detail. In yet another embodiment, the system may detect difficulty during discussions in resolving a topic during the main conference session. It may also detect that a topic is being extensively discussed by only a subset of the participants of the main conference session, and, as such, determine a need for the topic to be discussed during a breakout session.

At block 720, once the topics of discussion are determined, the system accesses a topic expertise score. In one embodiment, the topic expertise score is a recommended score that reflects the complexity of the topic to be discussed. For example, a high expertise score relates to a more complex topic and a lower expertise score which relates to a straightforward or a less complex topic.

Figure 8A:
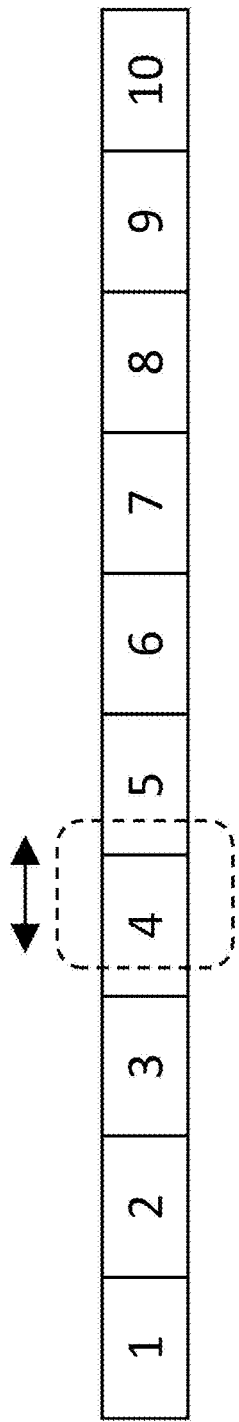
FIGS. 8A and 8B are block diagram for an example scale for a topic complexity score, in accordance with some embodiments of the disclosure.

Several categories may be analyzed by the control circuitry 504 to determine whether a particular topic requires further discussion, is the basis for a disagreement, or has conflicting views that require a breakout conference. In one embodiment, as depicted in FIG. 8A, the complexity score may range from 1-10, where "1" is associated with the least complex topic and "10" is associated with the most complex topic, among the topics of the main conference session. A 1-100 scale, or another numbering scale may also be used.

Figure 8B:
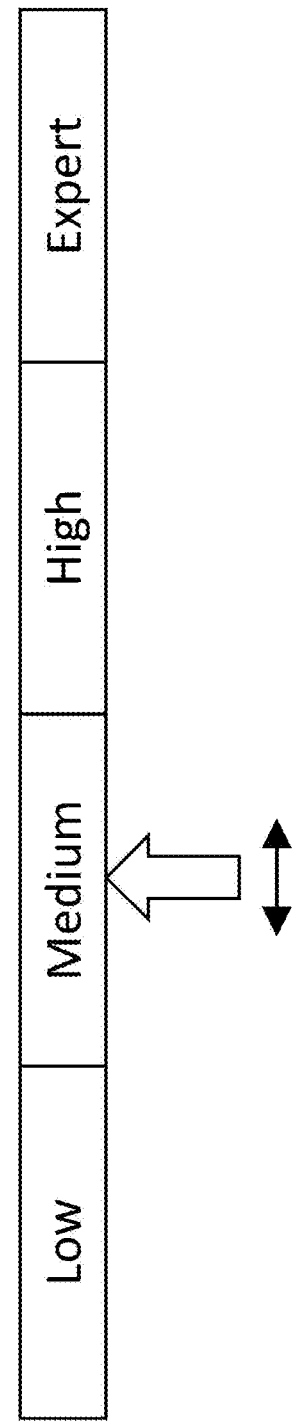

In another embodiment, the measuring scale used for associating the level of complexity may be different than the scale shown in FIG. 8A. For example, as depicted in FIG. 8B, a "low," "medium," "high," and "expert" scale may be used to associate the level of complexity of the topic, where "low" is associated with a least complex topic and "expert" is associated with the most complex topic, among the topics determined in the main conference room.

As depicted in FIG. 9, the complexity score may differ depending on the type of topic to be discussed. For example, the complexity score for a discussion topic that involves an office party that is to be planned by the participants is given a low complexity score of "2." The low score may be given since a low level of expertise is required to provide input for an office party. Since one may not need to have much experience and provide input relating to type of food or décor, this may be given a low complexity score. The low complexity score also implies that any one of the participants from the main conference session, whose expertise score meets the low complexity score, may be able to participate in this discussion.

In another embodiment, the topic "Thermal testing" is provided a complexity score of 6. Since thermal testing may require a certain amount of knowledge and expertise in the field, such as thermodynamics, or testing, which not every participant may possess, thermal testing is given a higher complexity score than "office party" planning. As such, participants that may intelligently contribute to a discussion relating to thermal testing will likely need to have some background and experience in thermal testing field to be able to analyze details of the topic and present intelligent views on the topic. Using the higher complexity score, the system determines whether a participant's knowledge level score meets the complexity score, and I so, allows them to participate in the conversation on the topic that is to be held in a breakout room. In other words, it can be used as a screening or gatekeeper tool. In another embodiment, the system may not use the topic expertise score, and only the participant's general or topic specific knowledge/skill score, in determining placement of the participant in a breakout room.

In another embodiment, the topic "Nuclear Fusion" is provided a complexity score of 10. In this embodiment, "10" may be the highest complexity score offered on this particular scale. Since nuclear fusion is a highly complex topic that not only requires a standard level of experience and expertise in the field, but probably requires a very high level of understanding to prevent any dangerous or fatal nuclear accidents occurring during the nuclear fusion, the topic is given the highest complexity score, among the topics of agenda in the main conference room. The topic, which is to be discussed in the breakout room, in some instances, may require someone to have a PhD in order to intelligently discuss it and provide guidance.

Other topics listed "supplies for thermal testing," "testing schedule," and "marketing," as depicted, received a complexity score of 5, 4, and 6 respectively.

Along with varying the complexity score, such as complexity scores described above in relation to FIGS. 8A, 8B, and 9, a complex topic may also have a higher threshold and a tighter spread of scores between participants. For example, a highly complex topic may have a high threshold that needs to be met for participants to be assigned to the topic and the scores of each participant may only differ from another participant by only 5%, or some other tighter spread. The tighter spread may be used to ensure that participants of a certain knowledge and caliber that are very similar in scores are placed together.

Referring back to FIG. 7, at block 725, once a complexity score is determined for all the topics designated for a breakout room discussion, the system determines the number of breakout rooms needed to discuss such topics. Several categories may be analyzed by the system, e.g., control circuitry 504 of the system depicted in FIG. 5, may be used to determine whether a particular topic requires further discussion, whether a breakout room should be generated to discuss the topic, whether the topic is related to any other topics for breakout room and if so, can it be combined with another topic and discussed in the same breakout room. One of the key factors in determining whether the topic requires its own independent breakout room session may be the complexity of the topic. For example, a topic with a high complexity score may get its own independent breakout room while a topic with a low complexity score may not get their own independent breakout room and may be combined with another topic for the breakout room. Instead, the topic may be combined with another topic in another breakout room or remain in the main conference room for discussion.

Considering the above factors, the system may determine the number of breakout rooms needed to discuss all the topics identified in the main conferencing session for discussion in the breakout rooms. The system may also combine topics or generate breakout rooms for specifically discussing only one topic. From the above-mentioned example, if the topic of discussion is "Nuclear Fusion," which is given a complexity score of "10," the system may generate a breakout room specifically for such discussion. The system may also select participants that meet a high-level criterion/score and have the background in nuclear fusion in determining which participants shall be part of the breakout session, e.g., the system may require the participant to have a certain personal score and/or a score related based on their knowledge level relating to nuclear fusion. The system may also determine that "Nuclear Fusion" should be broken into two rooms for discussion.

At block 730, the control circuitry 504 of the system depicted in FIG. 5, may determine a user score. The user may be associated with one or more devices and the control circuitry 504 may associate the user score with the device that will be used to connect to the breakout room. The control circuitry 504 may provide access based on the IP address of the device to certain breakout rooms that the user can join using the device and IP address.

Computing a user score, or score for the device that will be used by the user during the main conference and breakout room discussion or associating the user score with the user device is meant to be the same and used interchangeably. For ease of discussion, references will be made to user's score, which is then associated with the user device, such that a device score that meets the score criteria for a topic or breakout room can be admitted to the breakout room based on its score.

In one embodiment, the score can be computed based on a plurality of factors that are relative to context, other participants in the breakout room, geography, language, knowledge and expertise to name a few. Some examples of factors used in computing the user score are described in relation to descriptions of FIGS. 10-15.

Figure 10:
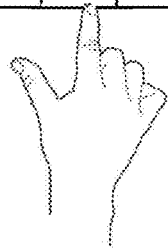
FIG. 10 is a table of scores for a plurality of breakout session topics, in accordance with some embodiments of the disclosure.

FIG. 10 is a table of scores for a plurality of breakout session topics, in accordance with some embodiments of the disclosure. As depicted in table 1000, scores for a participant (John) of the main conference session with respect to a plurality of topics/categories has been computed and displayed in the table. The scores may be computed by the control circuitry 504 depicted in FIG. 5. In computing the score, the control circuitry 504 may access one or more databases 477-484 as depicted in FIG. 4. The score may be provided based on the participant's performance in relation to a wide variety of contexts and factors, which may be dynamic and modified by the system, a host of the meeting, the company for which the participant works for, or any participant of the main conference. The score computation, e.g., the total score, may be an average or a mean of all the scores for each factor computed. It may also be a score that is based on a formula applied to all the scores that the system, host, or another user of the system may use as a method to calculate the score. The total score may also be dynamic and updated in real-time based on current performance in a breakout room or based on changing of other factors that form the basis of the score.

As depicted in FIG. 10, topic relating to "Administrative Tasks," receive a score of 24, while topics relating to "Technical Analysis," "Design Input," received a score of 73, "Product Testing," received a score of 74, "Employee Reviews," received a score of 38, "Management Tasks," received a score of 29, and "Holiday Party Planning," received a score of 18.

In addition to scores by topic, a score relating to John's engagement and discussion 740 during a breakout session is also provided. In this embodiment, John received an engagement discussion score or 78. Likewise, John's activity 1045 during a breakout session received a score of 78. Although the table depicts John's engagement 1040 and activity 1045 scores in this table 1000, many other factors relating to John's performance, interactions, and quality of discussion during a breakout room may also be measured.

The control circuitry 504 may access the scores and provide a plurality of breakout room placement options. In one embodiment, the control circuitry may also provide the scores to an AI algorithm such that the scores can be analyzed for a deeper understanding of the participant and their behavior.

For example, the control circuitry 504 may access the scores and provide them to the AI algorithm to determine John's performance as it relates to administrative and managerial tasks. As it can be seen from table 1000, John received a score of 24 for administrative tasks, a score of 38 for employee reviews, a score of 29 for management tasks, and a score of 18 for holiday party planning. The AI Algorithm may analyze these scores and provide recommendations that will aid the system or the host in determining whether or not to assign John to a breakout room which has topics relating to administrative and managerial tasks. In this embodiment, since John received low scores, e.g., 24, 38, 29, and 18, all of them below 30, the AI algorithm may provide a deeper understanding that John is not the best person to be placed on discussions relating to such topics.

In another example, the control circuitry 504 may access the scores and provide them to the AI algorithm to determine John's performance as it relates to technical and more complex tasks. As it can be seen from table 1000, John received a score of 81 for technical analysis, 73 for design input, and 74 for product testing. The AI Algorithm may analyze these scores and provide recommendations that will aid the system or the host in determining whether to assign John to a breakout room which has technical and complex topics that may require a higher score. In this embodiment, since John received high scores, e.g., 81, 73, and 74 for technical, design, and complex topics, the AI algorithm may provide a deeper understanding that John is better on the technical side and should be used in discussions relating to such technical and complex topics.

In one embodiment, the scores provided for engagement and discussions 1040 and activity during discussions 1045 may be an overall score irrespective of the context or the topic in which John is involved. In another embodiment the engagement and activity score may differ based on the context and the topic in which John may be involved. For example, John may not be as engaging in topics relating to administrative tasks as he would be in a discussion involving technical analysis. The AI algorithm may be used in dissecting the score and the related data in a variety of ways to provide a plurality of insights into John's breakout or main conference performance.

In one embodiment, as depicted in FIG. 10, any one of the contexts or scores may be selected to obtain a deeper analysis and breakdown of scores. For example, the host or a moderator of the main conference session or the breakout session may select using a user interface one of the contacts or score categories. In this embodiment, the host is selecting "Technical Analysis" using their user interface, which may have a touch screen. When selected, the control circuitry 504 may cause the display of a further breakdown as described in FIG. 11 below.

FIG. 11 is a table of a breakdown of scores for a specific topic of breakout session, in accordance with some embodiments of the disclosure. Table 1100 provides a deeper understanding of John's performance relating a topic, such as "Technical Analysis" 1010. The breakdown of scores may be obtained by the control circuitry engaging one or more databases, such as the databases 477-484 as depicted in FIG. 4 and analyzing the overall score into further breakdown based on some of the factors listed in FIG. 11. The breakdown of the overall score, which was 81 for technical analysis, may be computed based on the John's performance specifically in relation to topics relating to technical analysis. The breakdown of the score may be dynamic and it may change based on the underlying factors used in computing them.

As depicted in FIG. 10, John received a score of 81 with respect to speaking time, a score of 73 with respect to engagement, a score of 74 with respect to sharing of documents, a score of 38 with respect to providing action items, a score of 29 with respect to ability to resolve issues, a score of 64 with respect to bringing forth fresh ideas and creativity, and a score of 21 with respect to responding to criticism.

The control circuitry 504 may access the further breakdown of the scores and provide a plurality of options to use the breakdown scores in making conference and breakout room assignments and decisions. In one embodiment, the control circuitry may provide the breakdown of scores to an AI algorithm such that the breakdown can be dissected and analyzed for a deeper understanding of John's performance specific to topics relating to technical analysis.

For example, the control circuitry 504 may access the breakdown of scores and provide them to the AI algorithm to determine John's performance as it relates to dealing with conflicts, criticism, or assigning tasks to others. As it can be seen in table 1100, John received a score of 38 for providing action items 1120, a score of 29 for ability to resolve issues 1125 and the score of 21 for responding to criticism 1135. The AI Algorithm may analyze these scores and provide recommendations that will aid the system or the host in determining whether John is the best person in dealing with such situations. In this embodiment, since John received low scores, e.g., 38, 29, and 21, all of them below 40, the AI algorithm may provide a deeper understanding that John is not the best person to be placed in situations that may have a conflict or when he is required to assign tasks to others. Since John received high scores of 81 for speaking time 74 for sharing documents etc., the AI algorithm may provide a suggestion that John is more suitable for engaging in discussions relating to technical analysis and sharing his own work through documents. The AI algorithm may be used in other ways to dissect the breakdown of scores and the underlying related data and provide a deeper understanding of John's performance. A query may also be sent for the AI algorithm to dissect the data in the preferred manner, e.g., how does John perform when a short deadline is provided.

FIG. 12 is a table of scores based on a participant's performance when in presence of another participant in the breakout session, in accordance with some embodiments of the disclosure. The scores, as they relate to the presence of another participant e.g., a second participant, in the same conference/breakout session, may be computed by the control circuitry by accessing and engaging one or more databases, such as the databases 477-484 as depicted in FIG. 4. The score may be dynamic and based on changes to the underlying factors used in computing the score.

As depicted in FIG. 12, John received a score of 88 when another participant, Mary, was present in the same conference/breakout session in which John participated. Likewise, John received a score of 79 when participant Michael was present in the same conference/breakout session, a score of 42 when participant Robert was present in the same conference/breakout session, a score of 45 when any participant from the lab scheduling department were present in the same conference/breakout session, and a score of 91 when participant Solu, the CEO of the company, was present in the same conference/breakout session.

In one embodiment, the control circuitry 504 may access the scores as they relate to John's performance in the presence of each participant in the main conference session, or as it relates to participants that are targeted to be in a breakout session with John, to the AI algorithm to determine John's performance and potential for a successful and productive meeting when the other participant is in the same breakout room.

In one embodiment, the control circuitry 504 may provide John—Mary score, a score that determines John's performance when Mary is present, to the AI algorithm for further analysis. This score may have been computed by the control circuitry 504 by accessing databases 477-484 and extracting data relating to John's past performances when Mary was present in the same conference/breakout room as John. In another embodiment, if John has never been in the same room as Mary in the past, the AI algorithm may determine certain attributes of John and certain attributes of Mary and predict John where John may be paired with Mary's score to indicate his likely performance when and if John would be in the same conference/breakout room as Mary.

As depicted in Table 1200, John received a score of 88 when in presence of Mary. The control circuitry 504 may execute the AI algorithm based on the score to obtain further insights into John's performance when in presence of Mary. In one embodiment, the results of the AI analysis may be that John works well with Mary and performs at a high level. As such, a recommendation may be provided by the control circuitry that in future conference sessions John may be paired with Mary for a high performance or that no conflict or issues seem to be apparent.

Likewise, the control circuitry 504 may execute the AI algorithm based on the score "79" to obtain further insights into John's performance when in presence of Michael. In one embodiment, the results from AI analysis may indicate that John works well with Michael and performs at a high level.

In yet another embodiment, the control circuitry 504 may execute the AI algorithm based on the score to obtain further insights into John's performance when in presence of Robert. As depicted, John received a score of "42" 920 when in presence of Robert. As such, the AI analysis may result in determining that John does not work well with Robert and does not perform at a high level in Robert's presence. As such, a recommendation may be provided by the control circuitry that in future conference sessions John should not be paired with Michal and doing so may result in a lower performance. The control circuitry may also engage the machine learning (ML) algorithm to determine if the low score received by John when in presence of Robert is an outlier or if it forms a consistent pattern. In other words, the control circuitry may determine, based on historical data, if there were other contributing factors for John to receive a low score when in presence of Robert rather than the low score being attributed directly to the presence of Robert. Based on the ML data, a determination may be made if John's low score was an outlier or a consistent pattern when in presence of Robert.

As depicted in Table 1200, John received a score of 45 when in presence of any employee from the lab scheduling department. In addition to determining John's performance in presence of a popular individual one, the control circuitry 504, executing ML or AI algorithms, may also determine John's performance in relation to presence of any employee of the company from a specific department. As such, a score may be computed for John in relation to another participant as well as John in relation to a department for which the other participant works for to determine if any low or high score is attributed to the other participant or to the department as a whole. For example, in this embodiment, the control circuitry 504 may execute the AI algorithm based on the score "45" in table 1200 that is in relation to John's performance when any employee from the lab test scheduling department is in the same conference session as John. In one embodiment, the results of the AI analysis may be that John does not work well with any employee from the lab testing schedule department. A deeper analysis may reveal that the cause of the low score is due to John routinely performing lab testing and the lab testing department employees not being able to schedule John's tests within his deadlines.

In yet another embodiment, the control circuitry 504 may execute the AI algorithm based on the score to obtain further insights into John's performance when in presence of Solu, the CEO of the company. As depicted, John received a score of "91" 1230 when in presence of Solu.

Figure 13:
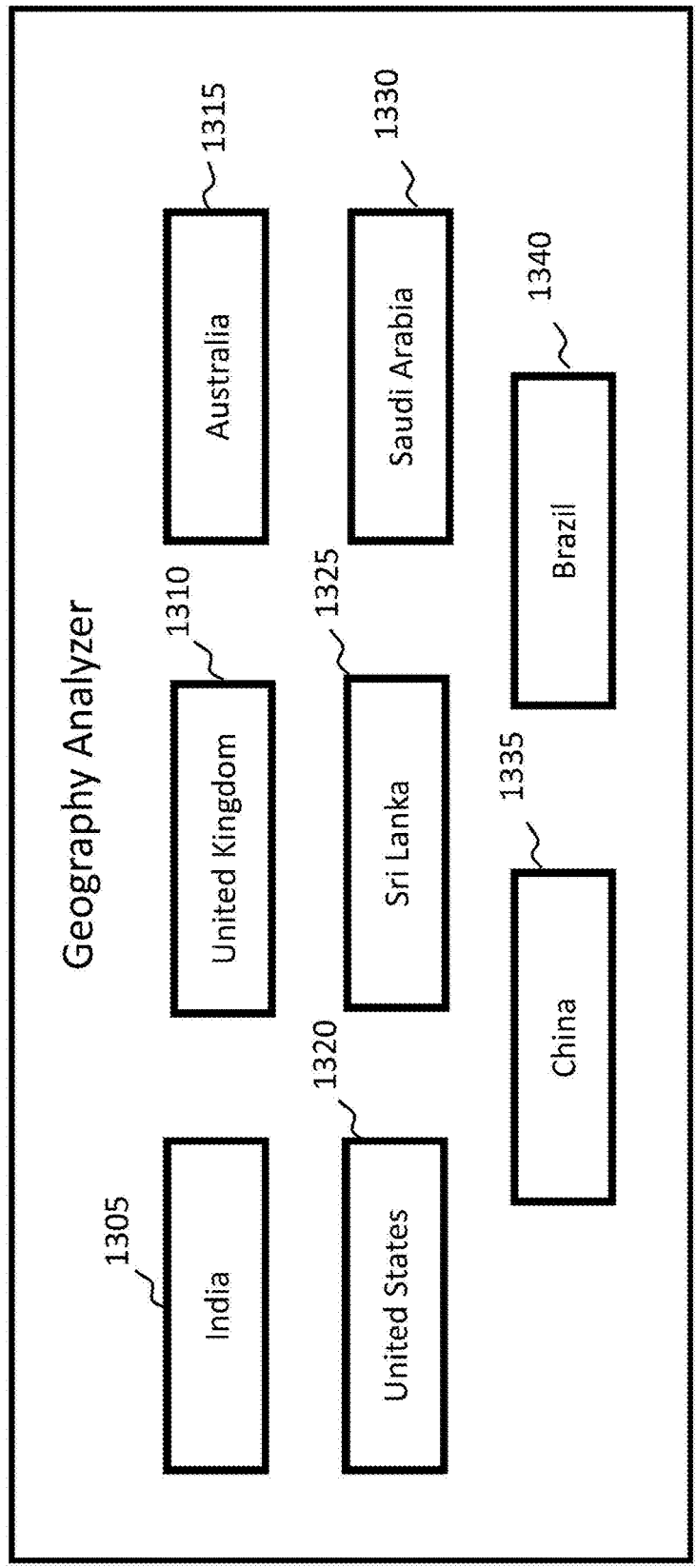
FIG. 13 is a block diagram of a geographic analyzer that analyses participant's performance when in presence of another participant from a different country in the breakout session, in accordance with some embodiments of the disclosure.

FIG. 13 is a block diagram of a geographic analyzer that analyses participant's performance when in presence of another participant from a different country in the breakout session, in accordance with some embodiments of the disclosure. The control circuitry 504 may invoke the geographic analyzer 1300 if it determines that the plurality of participants in the same main conference session or the breakout session may be from different countries and geographical regions. The geographical analyzer 1300 determines if a participant, such as John, works well with people from a certain country and provides a performance score for John when in presence of another participant from another country.

In one embodiment, John, who may be located in India, may have a high score when working with other participants from Sri Lanka, Saudi Arabia, China and Brazil. On the other hand, John may have a low score when working with participants from United States, United Kingdom, or Australia. The control circuitry 504 may access such country-by-country data and provide it to the AI algorithm for further analysis.

In one embodiment, since John received higher scores with countries neighboring India, such as Sri Lanka, Saudi Arabia, China, and lower scores with countries that are far away, such as United States, United Kingdom, and Australia, the AI analysis may result in determining that John works best when he is working with countries that are close to his time zone such that he doesn't have to be in conference sessions in the late or early hours.

In another embodiment, since John may have received a high score when working with a participant from Brazil, which is also far away from India and in a different time zone that is more than 8 hours difference, the AI analysis may result in determining that it is not a time zone issue but potentially an issue of an English speaking country with a different accent that may be harder for John to understand that is the cause of his lower score when it comes to United States, United Kingdom, and Australia. Although the time zone and different accent examples are provided, the AI algorithm may be used to further dissect John's performance in relation to other participants that are from different countries and the control circuitry may use the results of the analysis to provide recommendations for future conference and breakout sessions.

Figure 14:
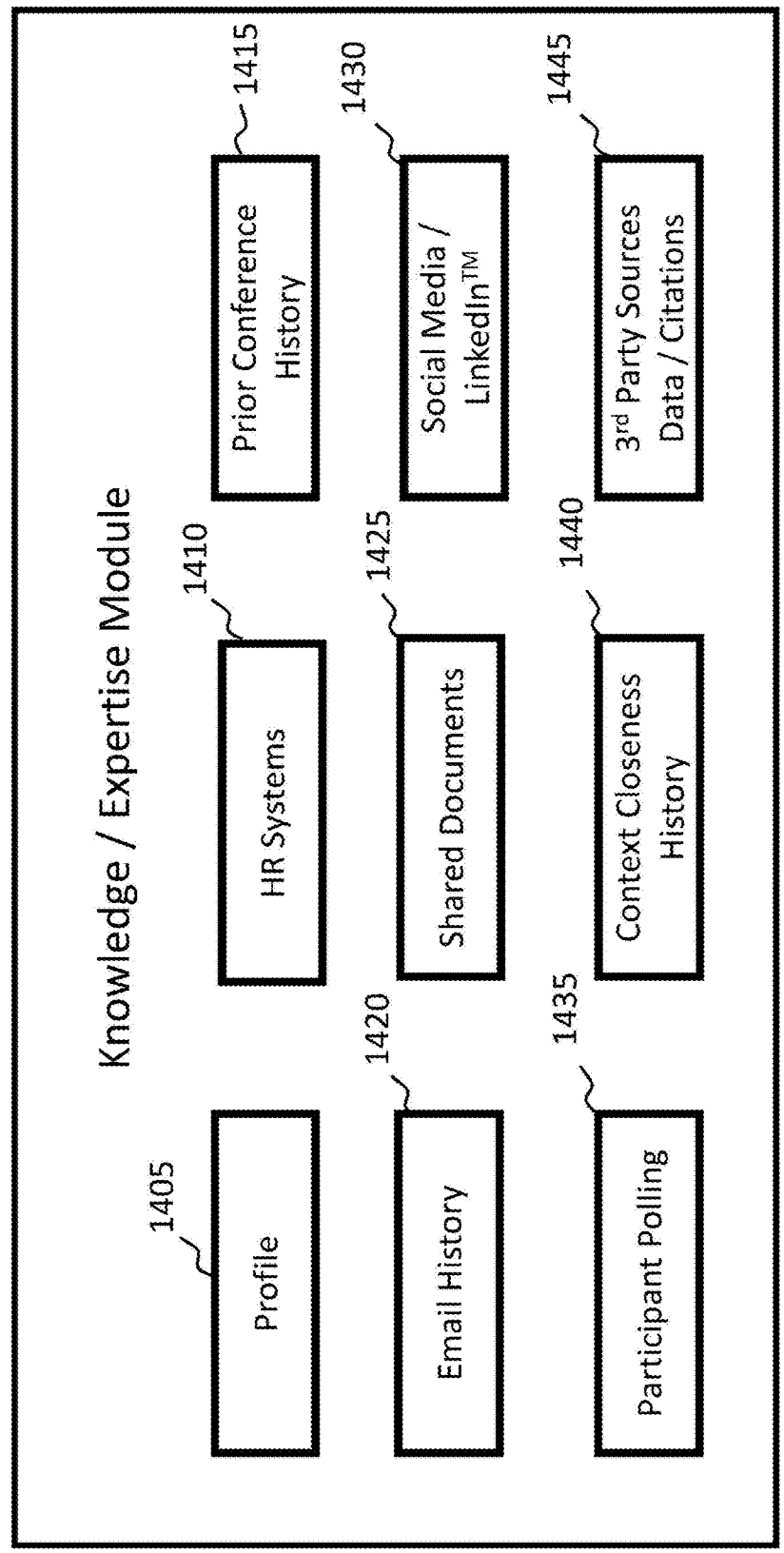
FIG. 14 is a block diagram of a knowledge module that accesses a plurality of sources and systems to generate a knowledge profile of a participant in the breakout session, in accordance with some embodiments of the disclosure.

FIG. 14 is a block diagram of a knowledge module that accesses a plurality of sources and systems to generate a knowledge profile of a participant in the breakout session, in accordance with some embodiments of the disclosure. In one embodiment, the score can be computed based on a plurality of factors that relate to a participant's expertise and knowledge. Such scores may be relevant and used by the control circuitry 504 in determining whether a participant has the adequate knowledge and expertise to productively contribute to a topic of the breakout room, which may that requires a certain level of knowledge and expertise.

In another embodiment, the control circuit may have also computed a complexity score for certain topics. If the participant's score does not meet the minimum score required by the topic, then the control circuitry 504 may determine that the participant is not qualified to engage in conversations relating to the complex topic and as such not assign the participant to a breakout room in which the topic will be discussed.

In one embodiment, the control circuitry 504 may invoke the knowledge/expertise module 1400. The knowledge/expertise module 1400 may store a profile 1405 of the participant in the storage, such as the storage described in FIGS. 3 and 5.

The profile may be generated by the participant, the system, or an employee of a company, such as someone from the HR department. In another embodiment, the control circuitry 504 may utilize ML and AI algorithms to obtain data and automatically populate the profile. For example, if a participant has discussed a topic in previous meetings or offered their opinion on a certain topic, the machine learning algorithm may be fed such prior meeting data to analyze and detect a pattern. The control circuitry may then populate the profile of the participant to indicate that the participant is knowledgeable on the previously discussed topic. In another embodiment, data from previous meetings, emails, chat sessions, and other information exchange, may be fed into an AI algorithm to analyze and predict the participants areas of strength and knowledge, and the control circuitry 504 may use such data to populate the participant's profile. The profile 1405 may also include skills, accolades, achievements, workplace reviews, and other information with respect to the participant's knowledge and skill. The control circuitry 504 may use such information and computing a score for the participant.

In another embodiment, as depicted in block 1410, human resources (HR) systems and databases may include the participant's history that can be accessed by the control circuitry 504 to determine the knowledge and expertise of the participant. For example, the HR systems may include the participant's employment history, workplace reviews, departments that the employee has worked for previously, any positive and negative feedback from other employees in the company that relate to the participant, and other information through which the employee's skill, expertise, knowledge, and know-how can be assessed.

One example of determining the participant's skill and knowledge may include accessing an HR system. If a participant has previously worked, assisted for a certain time, or perform a project, for the environmental testing department, although the participant's job title, list of expertise, or prior discussions may not include any mention of environmental testing, the HR system may store such data for employment records purposes. When a topic for the breakout room includes environmental testing, the control circuitry 504 may access the HR system database to learn of the participant's involvement and use such information in determining whether the participant should be included in the breakout session in which environmental testing will be discussed. The control circuitry 504 may use such information in computing a score for the participant.

The control circuitry 504 may also access prior conference history 1415, email history 1420, and previously shared documents 1425 by the participant whether in prior meetings emails or other context to determine the participant's knowledge, expertise, and skill level. Such information may be analyzed by the control circuitry 504 or fed into the ML and AI algorithms and the output of the analysis from the algorithms may be used to determine the participants knowledge or expertise level and use such information in computing a score for the participant.

In another embodiment, as depicted in block 1430, social media databases, such as LinkedIn™, Facebook™, Instagram™, Twitter™ and others may be accessed by the control circuitry 504. The participant may allow authorized access to the control circuitry 504 to access the social media sites and databases that are associated with the participant. In one embodiment, the control circuitry may access LinkedIn™ to determine the participants skill sets, degrees, any postings made by the participant on the LinkedIn™ platform, and any comments directed at the participant by other LinkedIn™ members. The control circuitry may also access comments posted by the participant on another individual's post on a social media platform. Likewise, the control circuitry may obtain data associated with the participant on other social media websites, including any posts, articles, comments either posted by the participant or directed at the participant. The social media data, such as the social media feed, posts, comments, likes, and dislikes, may be provided to the ML and AI algorithms for analysis. The control circuitry 504 may use the social media data analyzed results from the ML and AI algorithms to compute a score for the participant.

Figure 15:
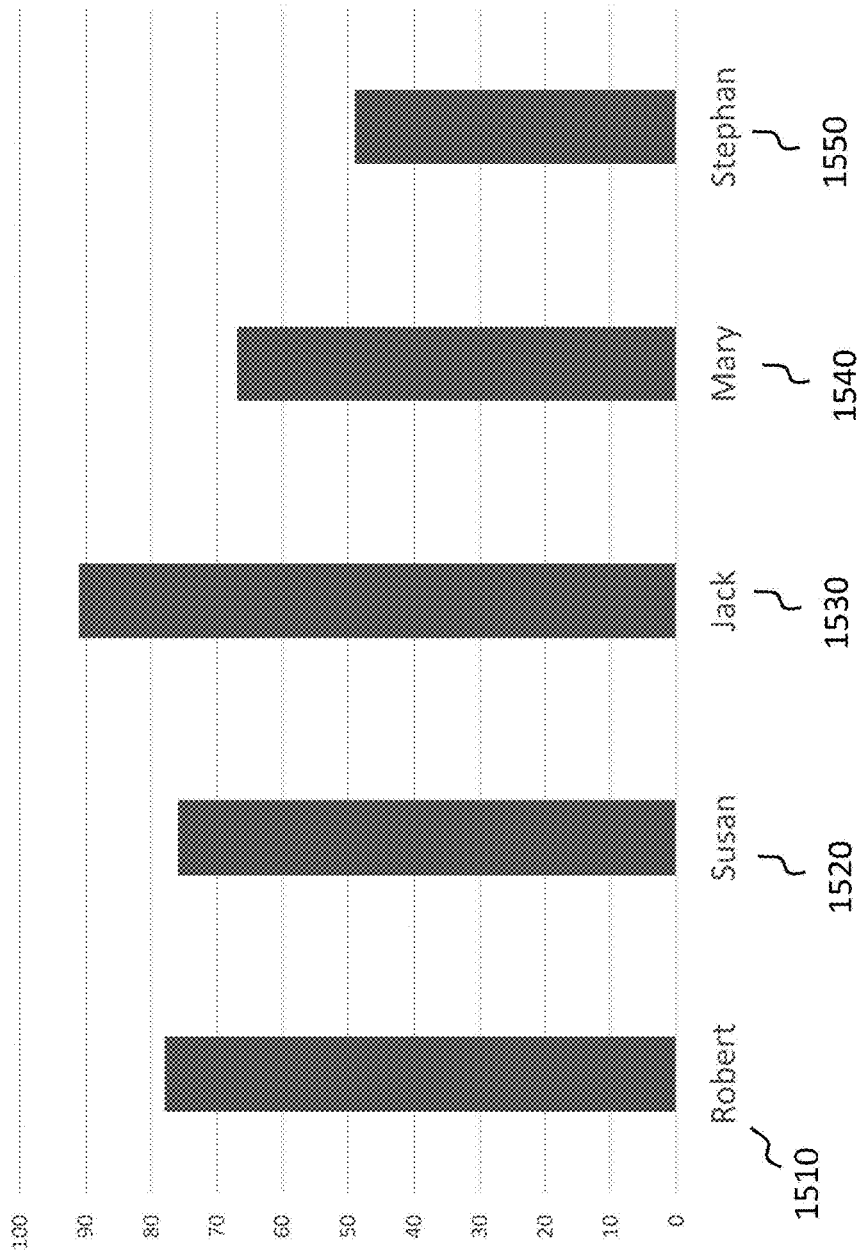
FIG. 15 is a chart of polling results of the participant that are based on input provided by other participants that were in the same breakout room as the participant, in accordance with some embodiments of the disclosure.

In another embodiment, as depicted in block 1435, the control circuitry 504 may conduct a survey or a poll to receive comments and scores from other employees and participants that have worked previously with the participant. The poll or survey may seek input from others to rate the participant in their skill set and their performance in main conference or breakout session. One example of results from such a poll or survey is depicted in FIG. 15. In one embodiment, the poll shows that Robert 1310 rated a participant Michael's performance with a score of 78, while Susan 1520 rated Michael's performance with a score of 75, Jack 1530 rated Michael's performance with a score of 91, Mary 1540 rated Michael's performance with the score of 67, and Stephan 1550 rated Michael's performance with a score of 49. The control circuitry 504 may analyze these scores and use them in determining an overall score for Michael. The score, which may be associated with Michael's knowledge and expertise, may be used, as mentioned earlier, in determining whether Michael might be fit to discuss a topic that requires a certain knowledge score.

In another embodiment, the scores may also provide an insight into whether a particular individual works well with Michael. For example, the control circuitry 504, in conjunction with ML and AI algorithms, may determine that Jack, who gave Michael a score of 91, works well with Michael and when an opportunity presents to pair Michael with Jack, it would likely result in a good performance. In another example, the control circuitry 504, in conjunction with ML and AI algorithms, may determine that Stephan, who gave Michael a score of 49, will likely not work well with Michael. The control circuitry 504 may utilize the ML algorithm to determine if Jack and Stephan's scores can be attributed to their working relationship with Michael and form a pattern or if it is a single occurrence in which such a score was given. The ML algorithm may detect patterns to determine if the same individuals gave a score to Michael in previous meetings that is in line with the currents score or if this is an outlier. Such determinations made allow the control circuitry 504 to determine whether Michael would work well with the individual who gave him the score in the poll/survey. The control circuitry 504 may use the polling/survey scores to compute a score for the participant.

Referring back to FIG. 14, at block 1440, the control circuitry 504 may analyze but context close next history of the participant. In other words, the control circuitry 504 may use the ML algorithm to determine if the participant in prior conferences has kept their discussion closely in context to the topic or if they had diverted from the topic. The control circuitry 504 may use the context closeness information to compute a score for the participant.

In another embodiment, as depicted in block 1445, the control circuitry may access third party sources, data, and citations to determine a skill set/knowledge score for the participant. For example, if the participant is a member of a technical forum, such as the Institute of Electrical and Electronics Engineers (IEEE) and has spoken at the IEEE conferences or written papers, then accessing the IEEE system, the system may obtain relevant information to access the user's knowledge proficiency on the topic and generate a score of topic proficiency for the participant.

As mentioned above, FIGS. 10-15 are some examples of factors used in computing the user score at block 730 of FIG. 7. The score is then compared to determine if it meets the topic expertise score at block 735, and if it does, then at block 745, the device associated with the user that meets the score is assigned to the breakout room where the topic is to be discussed. Such assignment, in one embodiment, may be automatic and without user intervention.

At blocks 750 and 755, the breakout room may be monitored and reconfigured as will be described in further detail in FIGS. 18-32.

Although the process of FIG. 7 describes a few factors for calculating score and using the score to assign participants to a breakout room, the embodiments are not so limited and other factors may also be considered in scoring and assigning participants. For example, assignments may be based on diversity of experience, background, style of discussion, engagement, race, ethnicity and other factors to balance the experience and diversity in a breakout room. In some instances, assignments may be made to sure there is adequate gender representation in a breakout room depending on the topic of discussion or to ensure various perspectives are discussed for the topic. A breakout room in which a topic such as marketing of a product to a mass audience is to be discussed may include participants from different walks of life that are representative of the target audience that will be buying the product.

In another embodiment, if the user expertise score does not meet the topic threshold, then the user may not be assigned to the topic and other alternative options, such as assigning the user to a different topic or keeping them in the main conference room, may be exercised.

Figure 16:
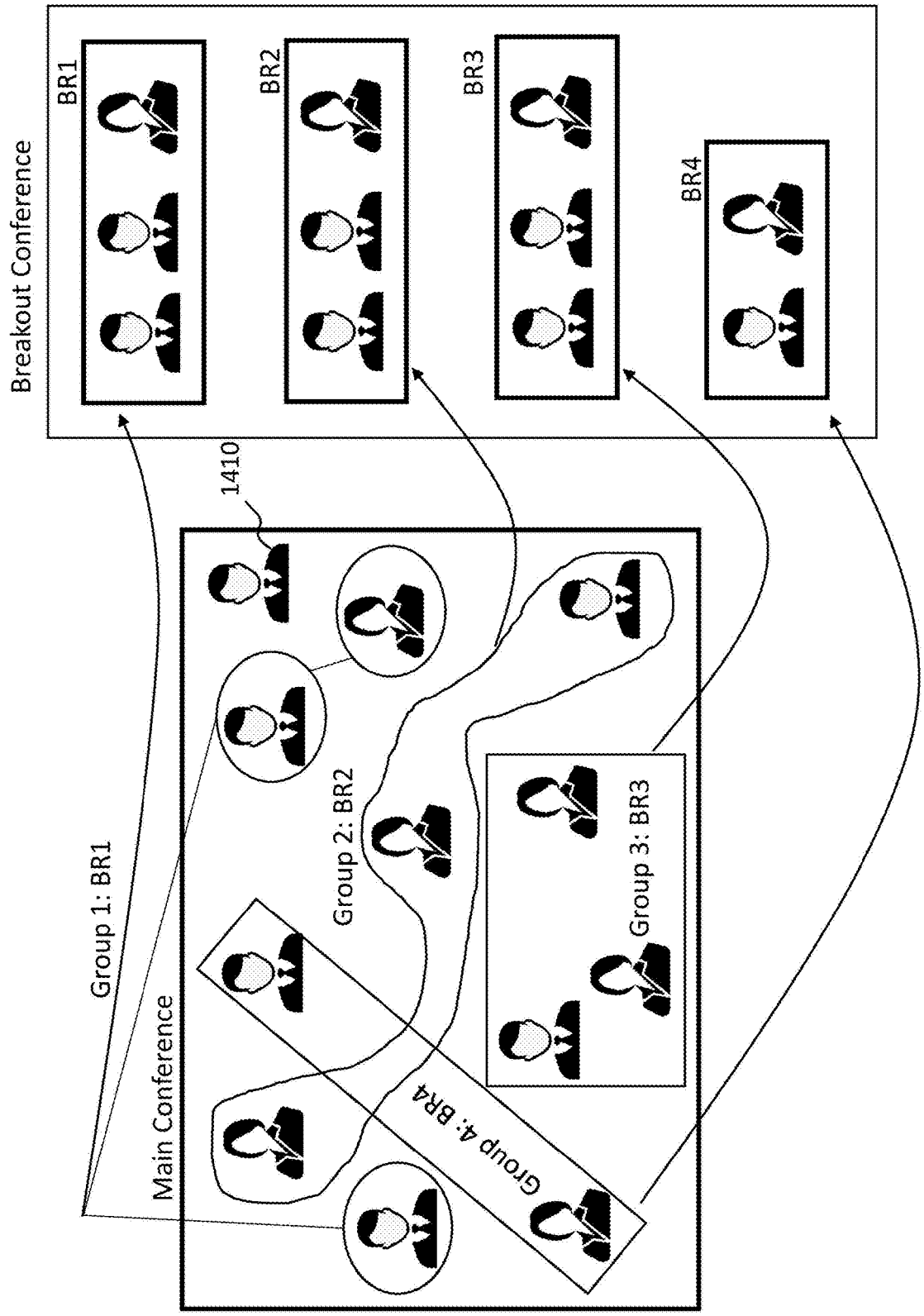
FIG. 16 is block diagram of assigning participants of the main conference session to a breakout session, in accordance with some embodiments of the disclosure.

FIG. 16 is block diagram of assigning participants of the main conference session to a breakout session, in accordance with some embodiments of the disclosure. In one embodiment, the control circuitry 504 may select participants from a main conference session based on their scores and assign them to different breakout conferences, each with a different designated topic of discussion. As depicted, participants of the main conference session have been assigned to breakout conferences BR1-BR4.

Figure 17:
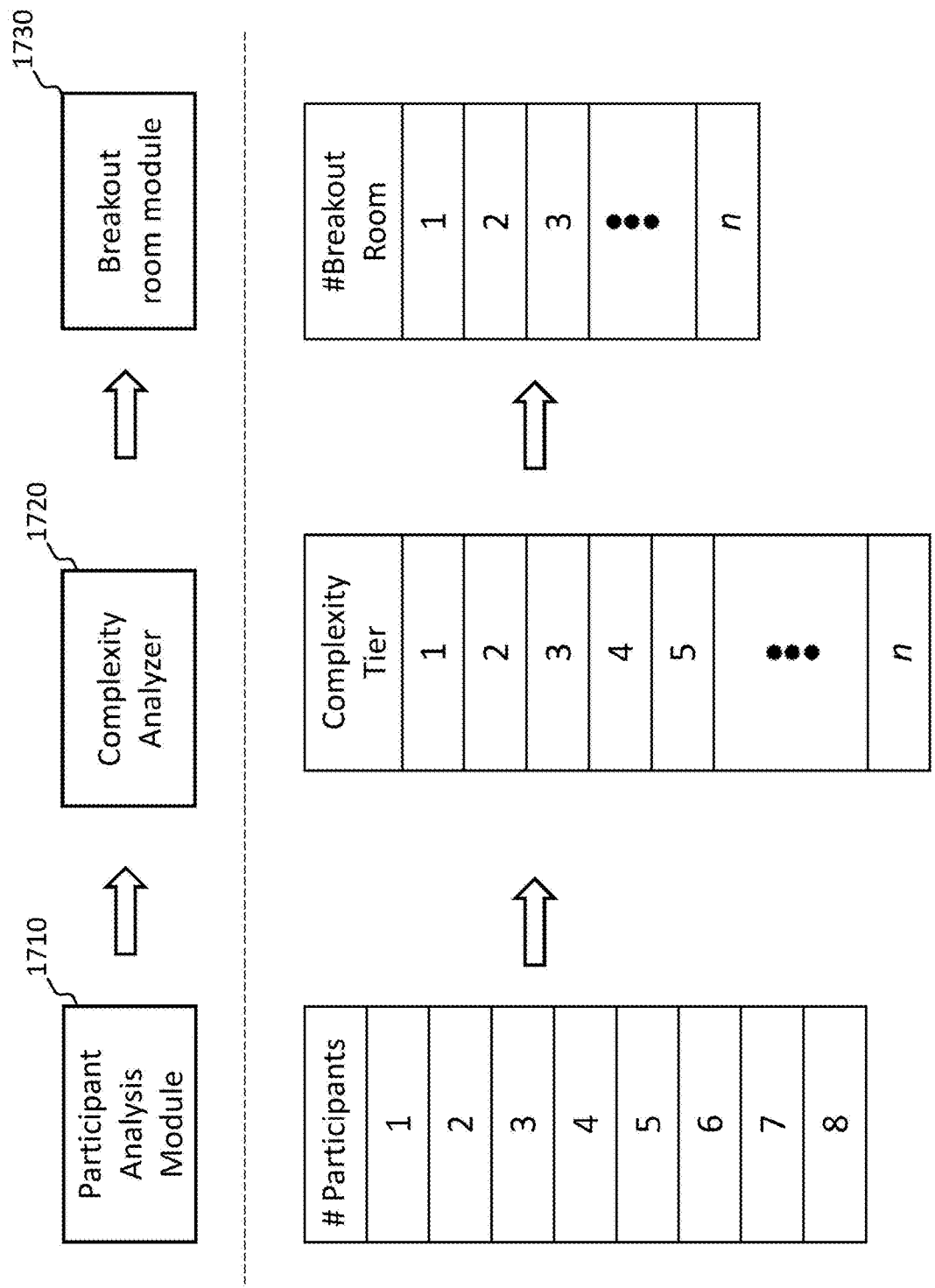
FIG. 17 is block diagram of associating participant scores with a complexity tier based on topic scores and assigning participants breakout rooms, in accordance with some embodiments of the disclosure.

In one embodiment, the control circuitry 504 may compute a complexity score for each topic to be discussed in the breakout room and assign participants from the main conference to the breakout room if their score meets or exceeds the complexity score for the topic. As depicted in FIG. 17, the control circuitry 504 may invoke a participant analysis module 1710, a complexity analyzer 1720, and a breakout room module 1730. The participant analysis module 1710 may be used to analyze the participant's score and store it in a database. A complexity analyzer may analyze the topic to be discussed and generate a complexity score for the topic. In one embodiment, the complexity score may be stored into a complexity tier. The breakout role module may use the complexity tier for automatically creating breakout rooms as needed and generating the process to seamlessly move the participants from a main conference room to the breakout room. In one embodiment, the control circuitry 504 may associate the participant score with a complexity tier. The tiers may be arranged in a sequential order ranging from low complexity to high complexity. If a participant qualifies for a particular tier, such as tier 3, where tier 4 has a lower complexity score than tier 3, then the control circuitry 504 may automatically qualify the participant for all tiers that are lower than tier 3 in their complexity score. The complexity scores in the complexity tier may be specific to the context of the topic.

Referring back to FIG. 16, in one embodiment, all the participants of the main conference may be assigned to a breakout conference room, and in another embodiment, some participants, such as participant 1410 may not be assigned to any breakout conference room.

In one embodiment, once the breakout conference is completed, the individuals from the breakout conference room will be seamlessly brought back into the main conference session. In one embodiment, the participants in the breakout conference room may use their user interface to indicate completion of the breakout conference, and the control circuitry 504 receiving the completion signal may automatically integrate them back into the main conference, wherein automatic refers to, in one embodiment, performing the function without user intervention. In another embodiment, the control circuitry 504 may display an approve button on the screen of the participant in the breakout conference, and upon selection of the approve button by the participant, the control circuitry 504 may integrate them back into the main conference.

Figure 18:
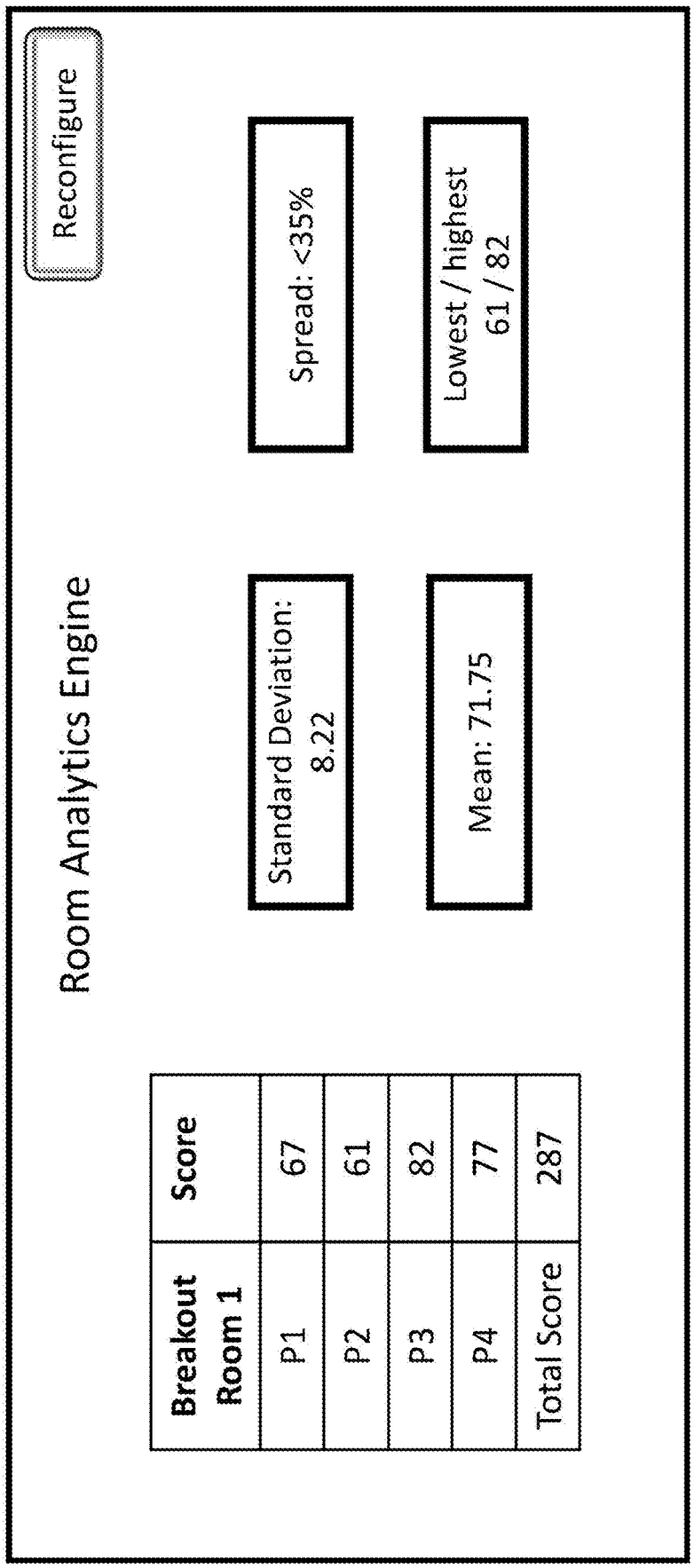
FIG. 18 is a user interface depicting scores of participants in a breakout room and analyzing the scores using a room analytics engine, in accordance with some embodiments of the disclosure.

FIG. 18 is a user interface depicting scores of participants in a breakout room and analyzing the scores using a room analytics engine, in accordance with some embodiments of the disclosure. In one embodiment, once the participants have been moved into a breakout room, such as Breakout Room 1 depicted in the user interface of FIG. 18, a room analytics engine can be used by a moderator, another individual, or system, to determine the breakdown of participant scores in the room.

As depicted, participant one (P1) of the breakout room has a score of 67, participant two (P2) has a score of 61, participant three (P3) has a score of 82, and participant four (P4) has a score of 77, with a combined total score of 287 for all the participants in the breakout room. In one embodiment, the system, moderator, or another user of the system, may desire for the participant's score to be within a threshold of a mean score. In another embodiment, the system, moderator, or another user of the system, may desire for the participant scores to be within a certain percentage of each other or the leader of the breakout session. In yet another embodiment, the system, moderator, or another user of the system, may desire for the participant highest participant score and the lowest participant score to be within a percentage of each other. Such percentages and thresholds may be predetermined either by a user or the system. The percentages and thresholds may also change as desired. In one embodiment, such percentages and thresholds may be set to ensure that participants of roughly the same score are grouped together in a breakout room.

In one embodiment, the room analytics engine may provide a plurality of tools to a user of the system. The tools may be displayed on the user interface of the electronic device associated with the user. The tools may allow the user to compute a standard deviation, mean score, lowest and highest score to calculate the difference, and allow the user to set a percentage spread between the scores of all users, such as the 35% spread indicated in the box. Other computational tools may also be provided to the user. The user interface may also display a reconfigure option allowing the user, such as the moderator, to move participants in and out of the breakout room in order to achieve the desired mean, standard deviation, spread or some other metric.

FIG. 19 is an example block diagram assignment of participants breakout rooms and averaging across all breakout rooms, in accordance with some embodiments of the disclosure. In one embodiment, the room analytics engine of FIG. 18 may be used to assign participants to breakout room such that the average score for the room is within a threshold of a desired number. As depicted, in one embodiment, a predetermined average score is set at 65 and the desire is to group participants in a breakout room that are within +/−20% spread or threshold of the desired average score of 65. As such, the control circuitry 504 may analyze the scores of all the users in the main conference room and distribute the participants into a plurality of breakout rooms such that an average of 65 and threshold of +/−20% can be maintained. The Breakout Rooms 1-4 depicted in FIG. 19 is one example of a sample distribution by the control circuitry 504 to maintain the predetermine average.

FIG. 20 is user interface depicting an initial breakout room assignment and a reshuffled/reconfigured assignment to average scores across all breakout rooms, in accordance with some embodiments of the disclosure. In one embodiment, the control circuitry 504 may have assigned participants to their respective breakout rooms, as depicted in Breakout Conference Room—Layout 1. In one embodiment, there may be a desire to balance the score spread between participants within a single breakout room, as depicted in FIG. 18, and in another embodiment, there may be a desire to balance the score spread across multiple breakout rooms. As it currently stands in Layout 1, the total score of breakout room one is 287, breakout room two is 251, and breakout room three is 235. The difference between the highest and the lowest total score (235 and 287) being greater than a 25% spread.

In one embodiment the system, moderator, or the user of the system, may use the user interface to change the percentage spread across all breakout rooms such that each breakout room's total score is within the predefined percentage spread. In a scenario where a percentage spread of less than 5% may be predetermined, the control circuitry may reshuffle the participants from one breakout room to another such that the total scores across all breakout rooms have a less than 5% spread. In some instances, the spread may be even tighter when a complex topic is being discussed, e.g., 2%.

In one embodiment, in order to achieve a less than 5% spread, the control circuitry 504 may move participant C3 from breakout room 3 to breakout room 1, move participant C2 from breakout room 3 to breakout room 2, move participant B2 from breakout room 2 to breakout room 3, and move participant A3 from breakout room 1 to breakout room 3. Based on the reshuffle of participants between the breakout rooms, layout 2 may result in a total participant score of 252 for breakout room 1, 262 for breakout room 2, and 259 for breakout room 3. As such the total scores across all three breakout rooms, i.e., 252, 262, and 259, are balance with a less than 5% spread across the breakout rooms. In one embodiment, a smaller spread, such as under 5 or 10% spread, may be desired to keep all rooms equally balanced.

In one embodiment, the scores of each participant, such as the scores described above in relation to FIGS. 18-20, may be provided to the moderator for making breakout room moderation decisions. In another embodiment, the scores may be hidden due to privacy reasons from the moderator and from other participants such that a participant score is not disclosed. In such embodiment, other indicators may be used to reflect the participant's performance. For example, color coding, shading, highlighting, or some other means of depicting the participant's performance instead of revealing their exact score, such as ranking them in a score bracket (between 50-75), or providing a letter grade, or showing another method of measuring them, such as satisfactory or needs improvement, may also be used. In another embodiment, the participant may have the choice whether to disclose their score. In yet another embodiment, only the HR department may keep the actual scores.

Figure 21:
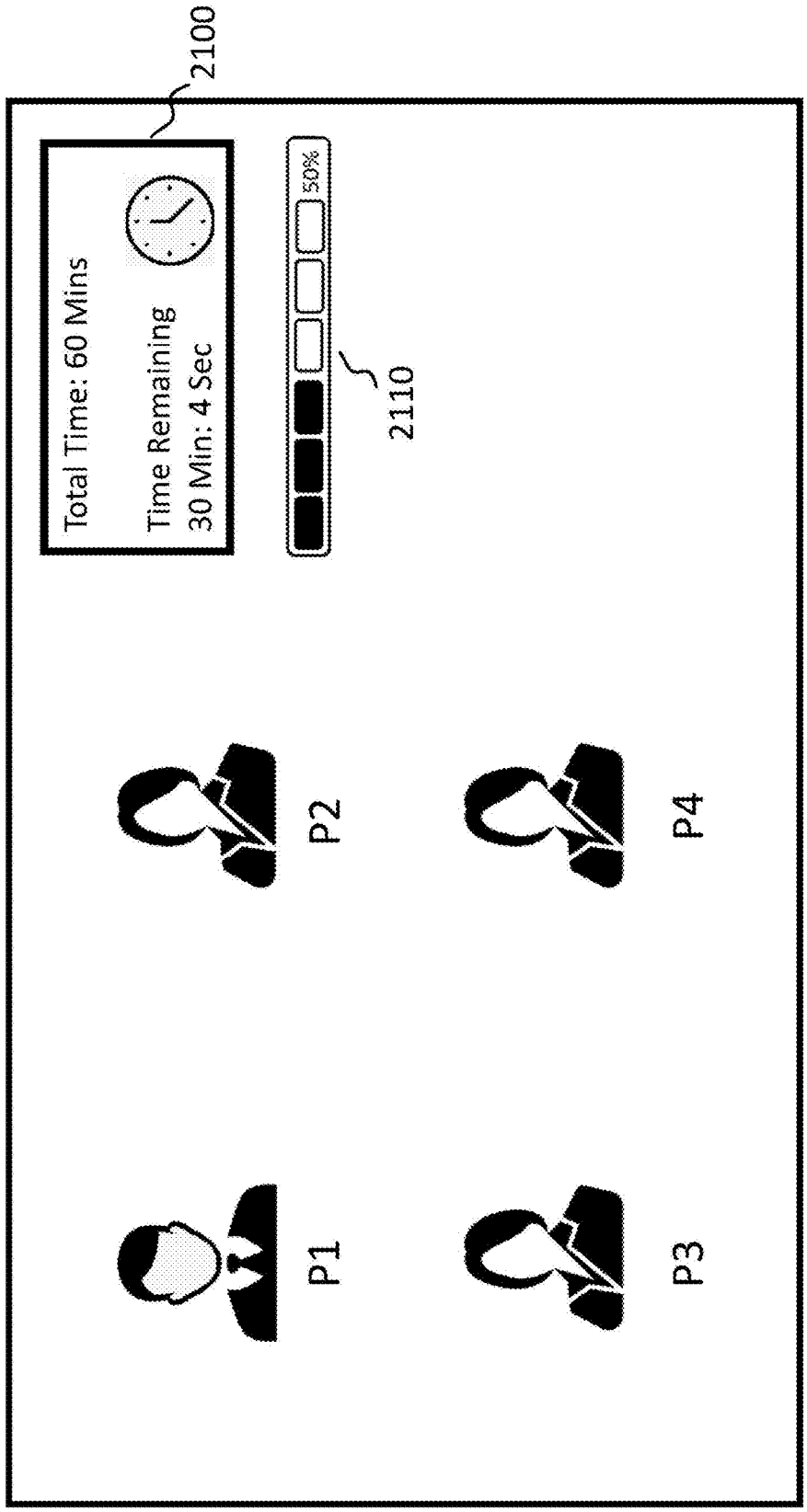
FIG. 21 is user interface depicting participants in a breakout room, in accordance with some embodiments of the disclosure.

FIG. 21 is user interface depicting participants in a breakout room, in accordance with some embodiments of the disclosure. In this embodiment, the user interface depicts four participants P1, P2, P3, and P4 in a single breakout room. The user interface may also include a timer 2100 that informs all the participants of the amount of time left in the breakout room conference. The user interface may also include a progress bar 2110 that depicts the amount of progress made in the breakout room.

Figures 22A, 22B:
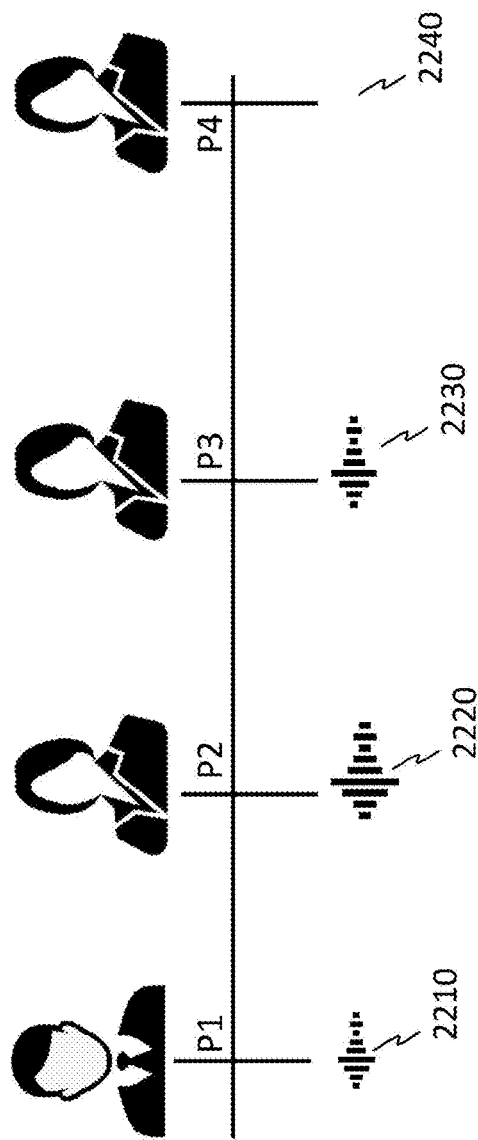
FIG. 22A is a block diagram of a plurality of participants in a breakout room and their voice signals, in accordance with some embodiments.
FIG. 22B is a table of voice signal received over a time period from participants in a breakout room, in accordance with some embodiments.

FIG. 22A is a block diagram of a plurality of participants in a breakout room and their voice signals, in accordance with some embodiments and FIG. 22B is a table of voice signal received over a time period from participants in a breakout room, in accordance with some embodiments.

In one embodiment, FIGS. 22A and 22B depict a situation when a higher decibel level is detected in a breakout room. The higher decibels may be associated with a first participant speaking over a second participant thereby interrupting the second participant. As shown in FIG. 22A, a plurality of participants P1-P4 may be attending a breakout conference session. The control circuitry 504 may monitor each participant's speech and associated decibel level and calculate an average decibel level for the conferencing session. As shown, a voice signal 2210 is captured for participant P1, a voice signal 2220 is captured for participant P2, and a voice signal 2230 is captured for a participant P3. As depicted, participant P4 may not have spoken during the breakout conference session and as such no voice signal has been captured.

FIG. 22B is a table that depicts a time at which each voice signal was captured, in accordance with some embodiments of the disclosure. As depicted, participant P1 may have spoken at time t=1 and in response to their speech, the control circuitry 504 may have captured the voice signal 2220 and determined a decibel level associated with the voice signal. If decibel level associated with participant P1's voice signal 2210 is taken as an average decibel level for the conversation, then, in some example embodiments, depicted by voice signal 2220, participant P2 has a higher decibel level associated with their voice signal as compared to the average decibel level. If P2's decibel level exceeds the average decibel level by a threshold number, then the control circuitry 504 may determine that P2's decibel level is associated with an interruption or a disagreement.

The overlapping voice signals of the participants speaking over each other are analyzed by the control circuitry 504, such as by using an AI algorithm, to determine if P2 or P3 have interrupted each other. If any interruption is detected, then the control circuitry may send an alert to the moderator informing them of the interruption. The control circuitry may also display an alert or a pop-up on the user interface of either all participants of the breakout session, or only those involved in the interruption, to provide the participant who was interrupted a chance to speak and complete the thought that was interrupted. The control circuitry may also display closed caption of some of the words uttered prior to the interruption to remind the interrupted participant of their thoughts.

In another embodiment, if the control circuitry 504 determines that multiple voice signals overlap each other, then a determination is made whether the overlapping voice signals are associated with an interruption or something else. For example, as shown in FIG. 22B, which is a table of voice signals captured for each of the participants P1-P4 in FIG. 22A, at time t=2, participants P2 and P3 have overlapping voice signals 2260. If the control circuitry 504 determines that the overlapping voice signal 2260 is associated with an interruption, then an alert and/or a reminder for the interrupted participant to speak may be provided. The reminder may also be in form of an invitation for the participant to interact or engage in the breakout session.

Figure 23:
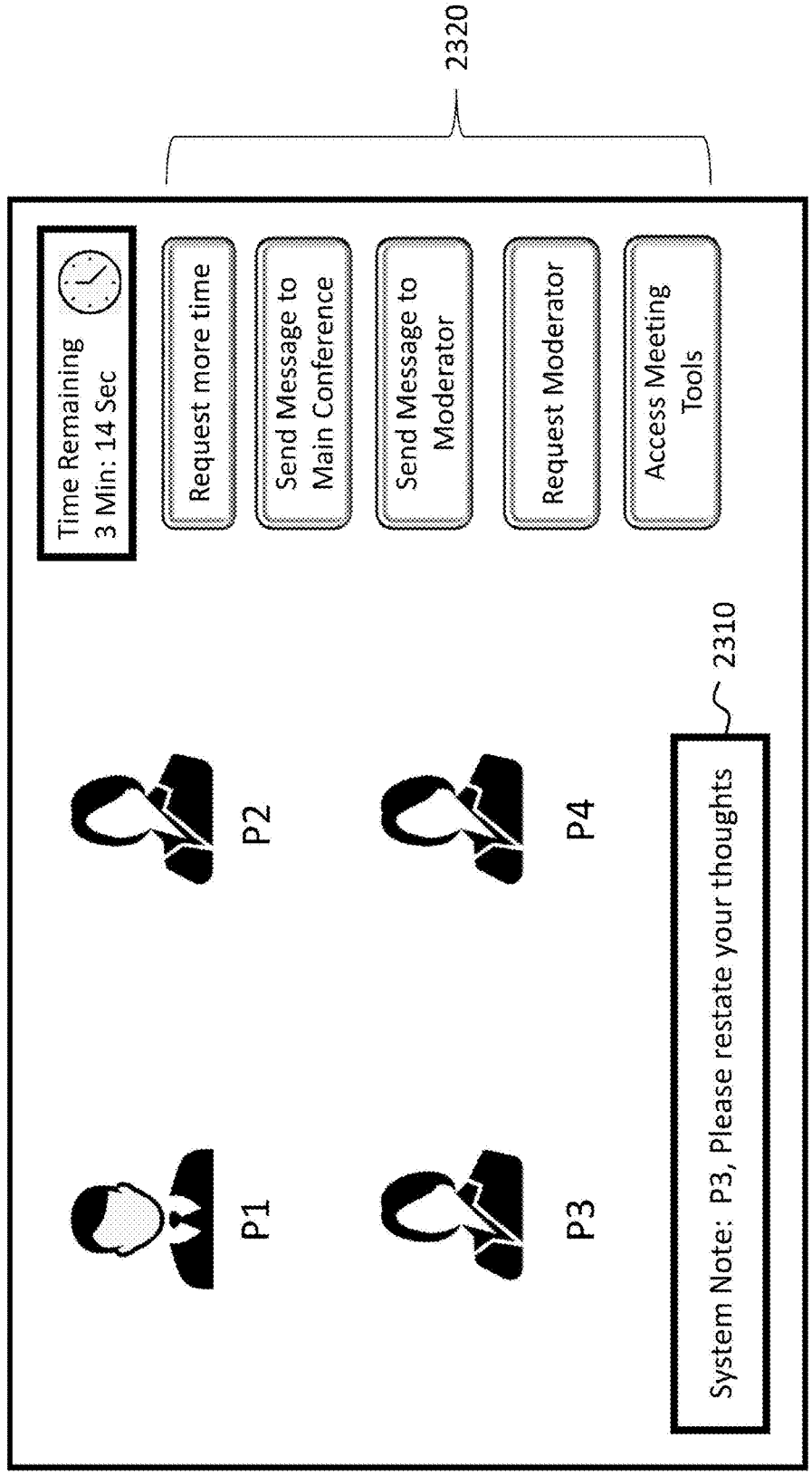
FIG. 23 is user interface depicting a message received by participants in a breakout room, in accordance with some embodiments of the disclosure.

FIG. 23 is user interface depicting a message received by participants in a breakout room, in accordance with some embodiments of the disclosure. As described earlier in context of FIG. 22, when an overlapping signal is detected, the control circuitry 504 may send a message, such as message 2310, to either all the participants of the breakout room, or only two the participants involved in the interruption.

In one embodiment, the user interface 2300 may also display other meeting tools 2320 that can be used by the participants in the breakout room. For example, if an interruption is detected, the control circuitry 504 may cause to display, a "Send Message to Moderator" or "Request Moderator" button that can be selected by any of the participants in the breakout room to send/transmit a message to the moderator informing the moderator of the interruption. The button selection may also send a request to the moderator to join the breakout room. The control circuitry 504 may also cause to display other meeting/conferencing tools that may allow the participants to request more time for the breakout session, send a message to main conference session, whether due to an interruption or otherwise.

Figure 24:
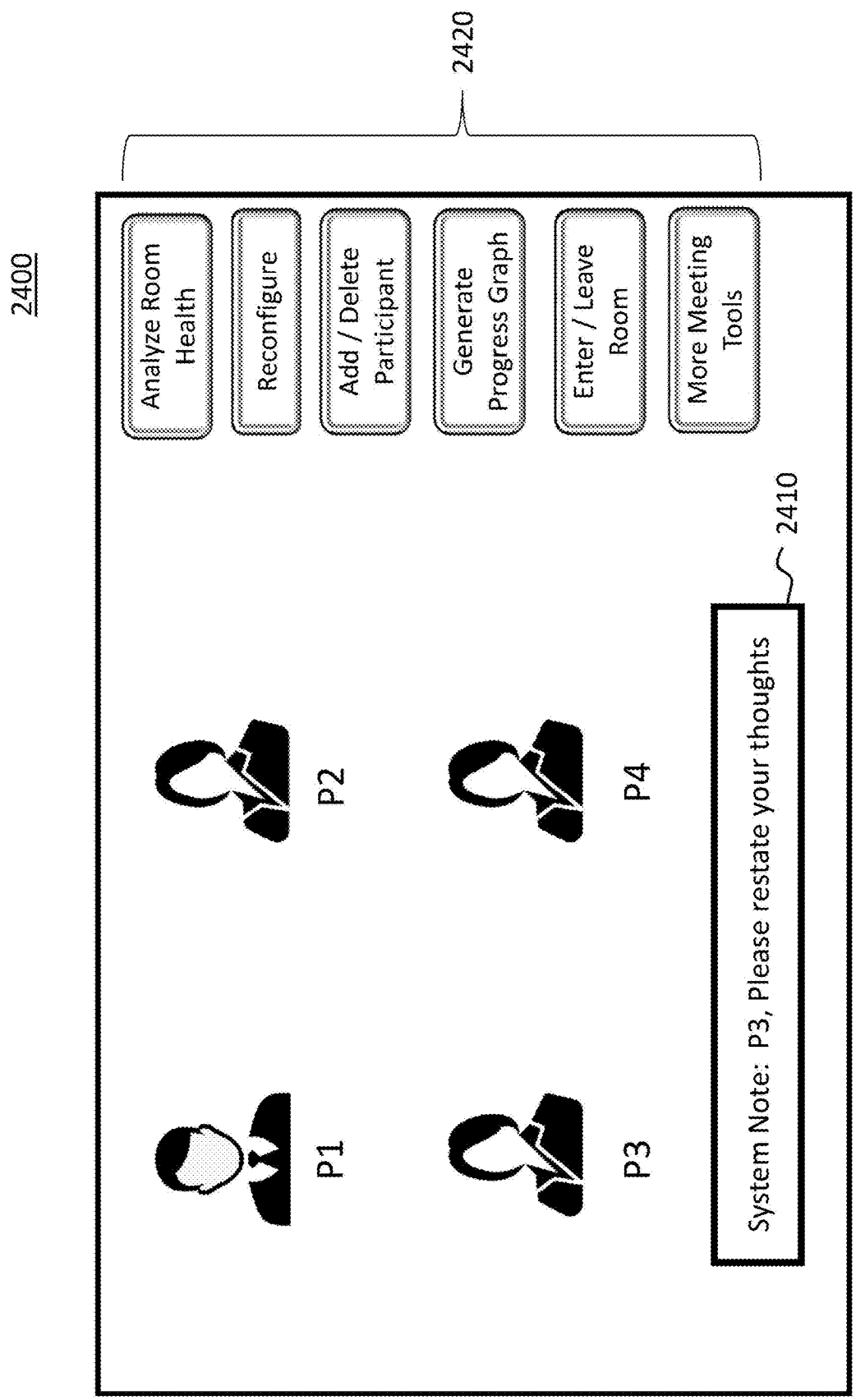
FIG. 24 is user interface displayed to a moderator, in accordance with some embodiments of the disclosure.

FIG. 24 is an example user interface displayed to a moderator, in accordance with some embodiments of the disclosure. In addition to sending a message on the participant's user interface when an interruption occurs, the control circuitry 504 may also cause a message, such as message 2410, to display on the moderator's user interface 2400. The moderator may decide to send/transmit a message in response to the breakout room to be displayed on the participant's user interface or decide to enter the breakout room. That control circuitry 504 may also display additional meeting tools 2420 on the moderator's user interface such that the moderator can analyze the room health, reconfigure participants in the breakout room, add or delete a participant, and/or generate a progress graph that shows the progress being made within the breakout room.

Figure 25:
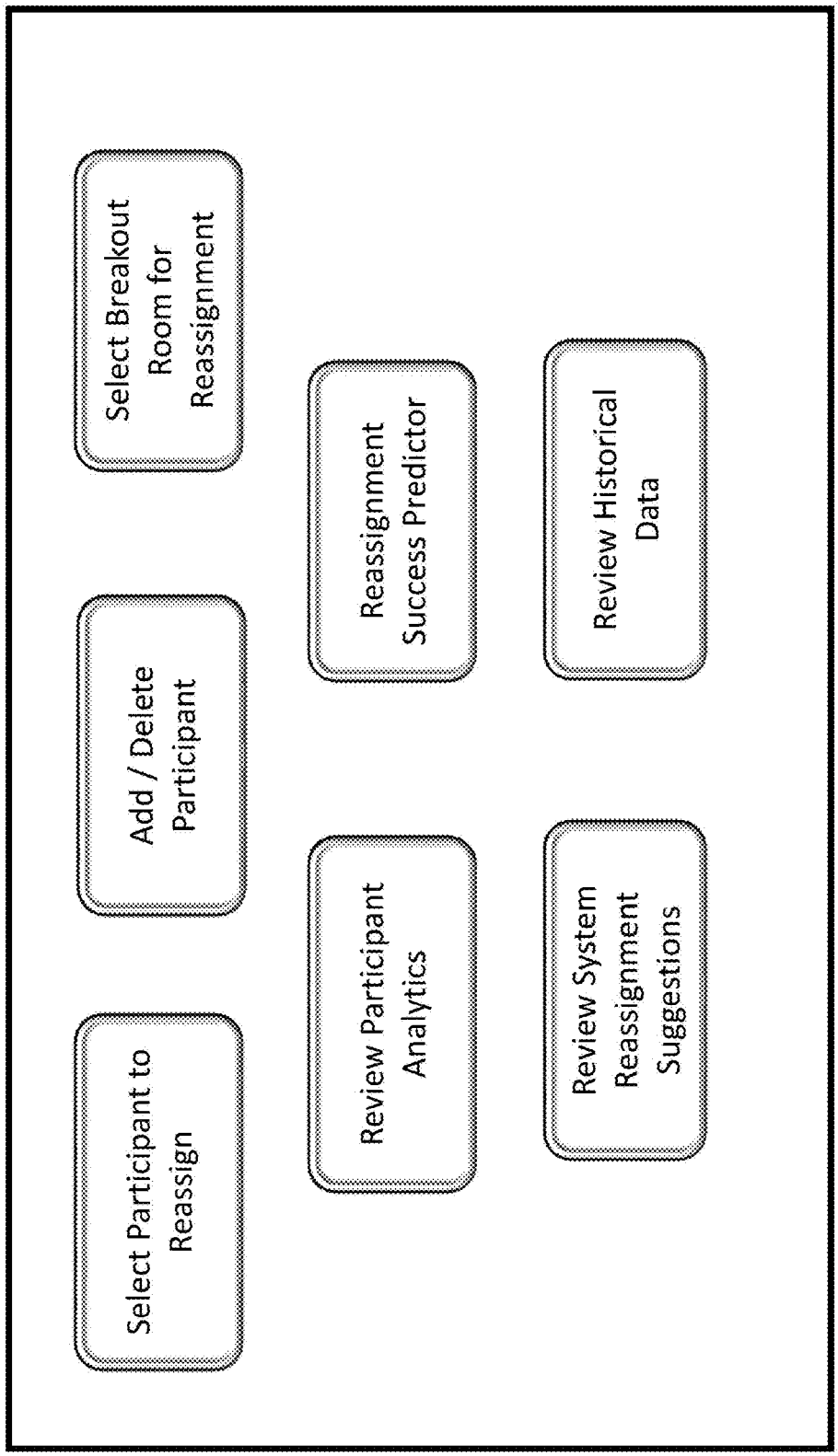
FIG. 25 is user interface for a moderator to assign and shuffle participants in a breakout room, in accordance with some embodiments of the disclosure.

FIG. 25 depicts an example user interface for a moderator to assign and shuffle participants in a breakout room, in accordance with some embodiments of the disclosure. In one embodiment, the moderator's user interface may include tools to select a participant and reassign them to a different room. In this embodiment, the moderator may use their mouse or tap on a touch screen and select a participant and reassign them to a different breakout room.

In another embodiment, the moderator's user interface may include tools to add or delete a participant to a breakout room. The participant may be added either from another breakout room or from the main conference session.

In another embodiment, the moderator's user interface may include tools to select a breakout room for reassignment. For example, the moderator may decide to reassign the breakout room with a different topic and different set of participants.

In another embodiment, the moderator's user interface may include tools to review participant analytics. These include the performance of each participant during the breakout room. The analytics may also include participant's score, prior history in conference rooms, participant's skill sets, and other participant data relevant to the topic or the breakout room.

In another embodiment, the moderator's user interface may include a reassignment and success prediction tool. For example, when a reassignment and success prediction tool is activated, the control circuitry 504 may invoke ML and AI algorithms to analyze historical data involving the participant and determine whether the participant in the current breakout room may perform successfully. In one embodiment, the control circuitry 504, by using the ML and AI algorithms to analyze participant historical data, may determine that the current participant does not work well with a second participant in the breakout room, and as such may predict a lower percentage of success based on such historical data.

In another embodiment, the moderator's user interface may include tools to determine reassignments. In this embodiment the system may analyze data from all breakout rooms and provide suggestions for reassignments. The moderator may also select a "review historical data" button and by doing so, the control circuitry 504 may display prior performance data of the participant from other conference sessions.

Figure 26:
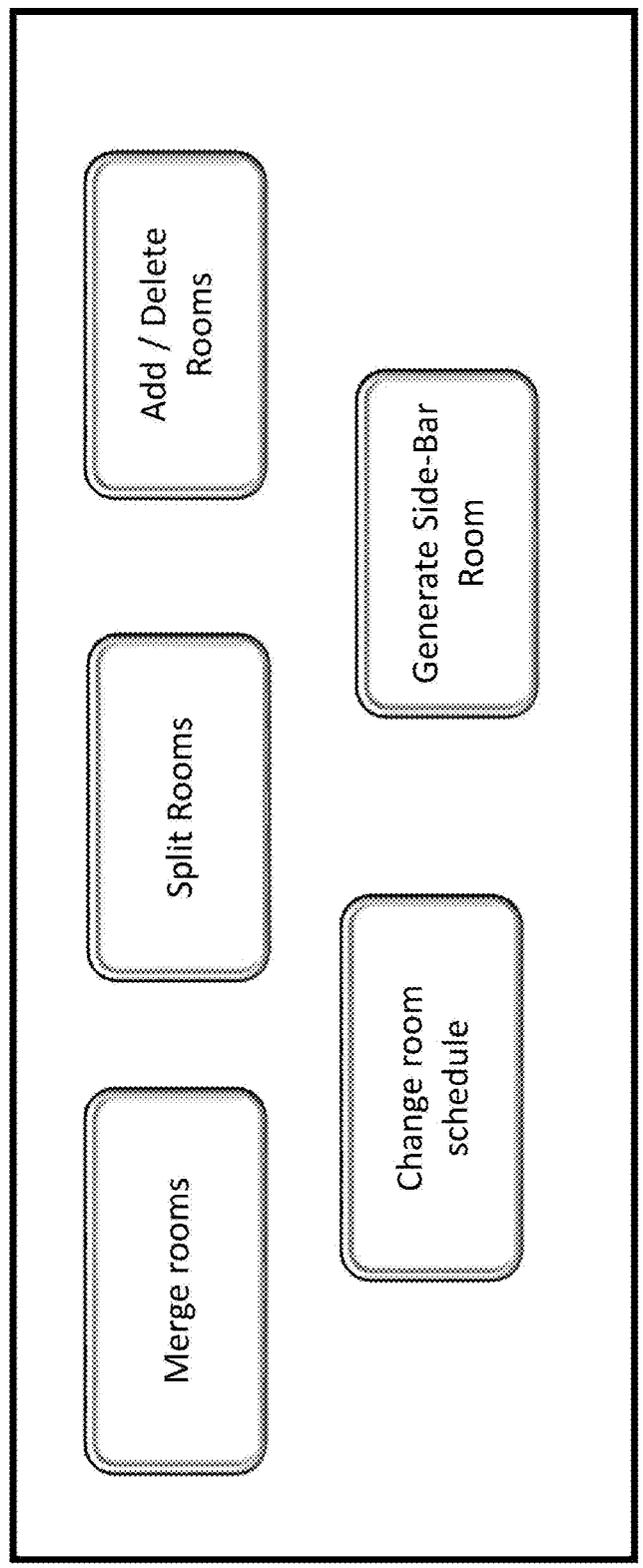
FIG. 26 is user interface for a moderator to merge, split, and perform breakout room modifications, in accordance with some embodiments of the disclosure.

FIG. 26 is user interface for a moderator to merge, split, and perform breakout room modifications, in accordance with some embodiments of the disclosure. In one embodiment, the moderator may use displayed conference management tools to merge rooms or split rooms, add or delete rooms, change room schedule, or generate a sidebar room.

If the moderator or the system detects interruptions or disputes in a breakout room, or the text that the graph depicting the breakout room health is going in a negative direction, then the moderate may select a "generate sidebar room" to have a 1-on-1 discussion with the participant of the breakout room, such as with a participant that is causing a disruption.

Figure 27:
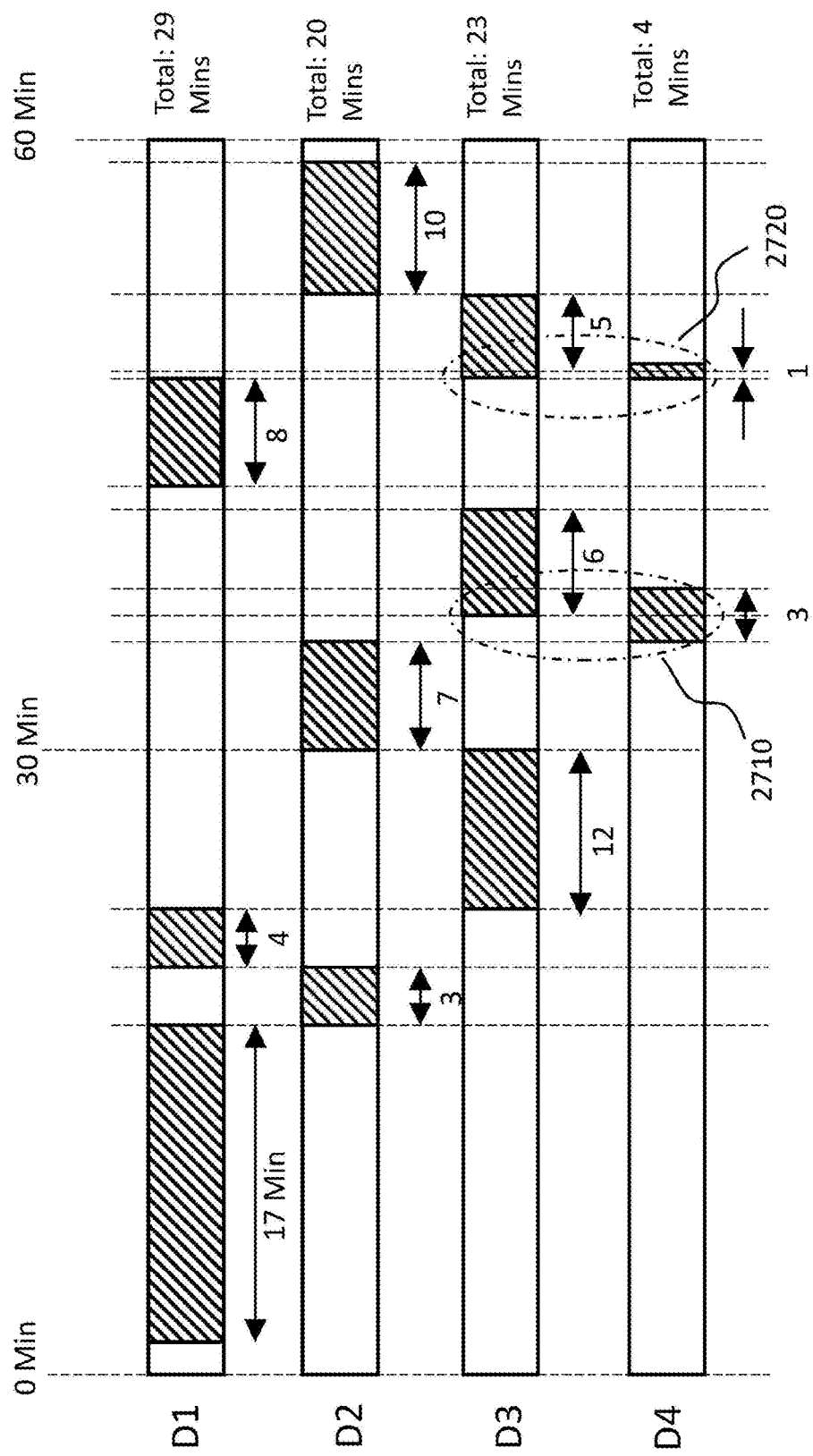
FIG. 27 is a chart displayed on an interface showing the amount of time and timestamps at which participants of a breakout room were speaking, in accordance with some embodiments of the disclosure.

FIG. 27 is a chart displayed on an interface showing the amount of time and timestamps at which participants of a breakout room were speaking, in accordance with some embodiments of the disclosure. In one embodiment the control circuitry 504 may determine which participant spoke during the breakup conference and the duration of their speech. The control is circuitry may use such data to display a timing chart, such as the timing chart 2700, that represents the amount of time and timestamps at which each participant spoke during the breakout conference.

In one embodiment, the timing chart 2700 may give an insight into the performance of each participant and their engagement during the breakout session. For example, participant D1 spoke for 29 minutes during the breakout session while participant D2 spoke for 20 minutes, participant D3 spoke for 23 minutes, and participant D4 spoke for four minutes. The data relating to participant's engagement during the breakout session may be used by control circuitry 504 to compute or adjust the participant's score.

In another embodiment, the control circuitry 504 may execute the AI algorithm to analyze the data from the timing graph 2700. The AI algorithm may we used to obtain deeper insights into the performance during the breakout session. For example, the analysis performed by the AI algorithm may indicate that D4's performance was on the lower end of the spectrum as compared to other participants in the breakout room because every time D4 spoke, D3 interrupted D4, such as at 2710 and 2720 which may have led to D4's lower performance. Further insights may be provided by the control circuitry 504 based on the analysis performed by using the AI algorithm which may help determine whether D4 should be paired with D3 in the future in the same conference room.

Figure 28:
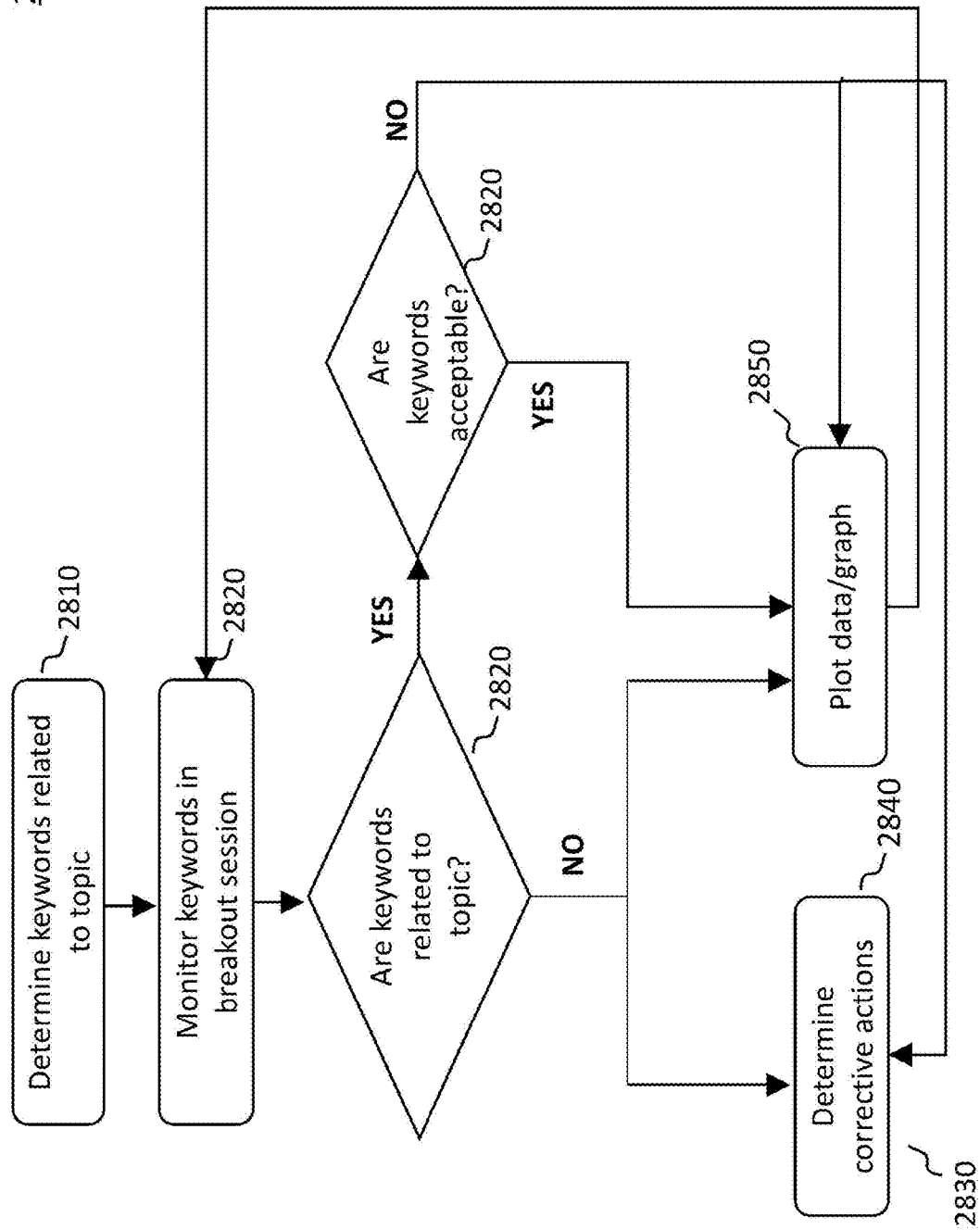
FIG. 28 is flowchart of a process for monitoring a breakout room and charting the progress of discussion in the breakout room, in accordance with some embodiments of the disclosure.

FIG. 28 is flowchart of a process for monitoring a breakout room and charting the progress of discussion in the breakout room, in accordance with some embodiments of the disclosure. In one embodiment, process 2800 determines whether discussion within the breakout room is within the context of the topic that was identified for the breakout room. Such insight is useful to a moderator of the room to determine whether any corrective actions are required, for example, to bring the discussion within the breakout room back into the context of the topic.

In one embodiment, the process begins at block 2810. The control circuitry 504 determines a set of keywords that are related to the topic designated for discussion in the breakout room.

At block 2820, the control circuitry 504 monitors the discussions within the breakout room and extract keywords from the discussions. These keywords may be extracted from spoken dialogue as well as any chat that was entered during the breakout session between the participants. The control circuitry may also use natural language processing (NLP) systems to look for keywords like topic, area, agenda, or keywords within a topic.

At block 2820, the control circuitry 504 determines whether the keywords extracted from the dialogue within the breakout room relate to the keywords associated with the topic designated for discussion in the breakout room. In one embodiment, the control circuitry 504, may use the AI algorithm to determine if the keywords from the participant's dialogue are within context of the topic of discussion.

If a determination is made at block 2820 that the keywords are not within the context of the designated topic for the breakout room, then at block 2830, the control circuitry 504 may determine corrective actions for bringing the discussion back within the context of the topic. Such corrective actions may include, seeking moderator input, inviting the moderator to join the breakout room and provide their input, providing alerts which may be displayed on the participant's user interface that request the participants to bring the conversation back within context of the designated topic.

In addition to determining corrective actions, the control circuitry 504 may also plot a downward movement in a graph to indicate that the discussions in the breakout room are not progressing well and swaying away from the context of the designated topic.

If a determination is made at block 2820 but the keywords extracted from the discussion relate to the topic, then another discussion may be made at block 2820 to determine whether the keywords are acceptable. For example, keywords that relate to profanity, rude or harsh language, accusatory language, or anything that would be outside the HR policies for the company, would not be acceptable.

If a determination is made that the keywords are acceptable, then the control circuitry 504 may plot the data on the graph as an upward movement to indicate that progress is being made and the discussion is staying within the context of the topic designated for the breakout room. The control circuitry 504 will also plot the data if the keywords are not acceptable and indicate downward or negative movement in the graph. The monitoring in the room may continue and the process 2800 would move to block 2820 and repeat itself until the end of the breakout session.

In addition to monitoring speaking time, such as in FIG. 27, and keeping the discussion with the assign topic, such as in FIG. 28, in one embodiment, other indicators may also be monitored to chart the progress of discussion in the breakout room. For example, other indicators may include engagement/interaction within participants, such as through camera on/off, microphone on/off, screen sharing activity, other input device activity.

Figure 29:
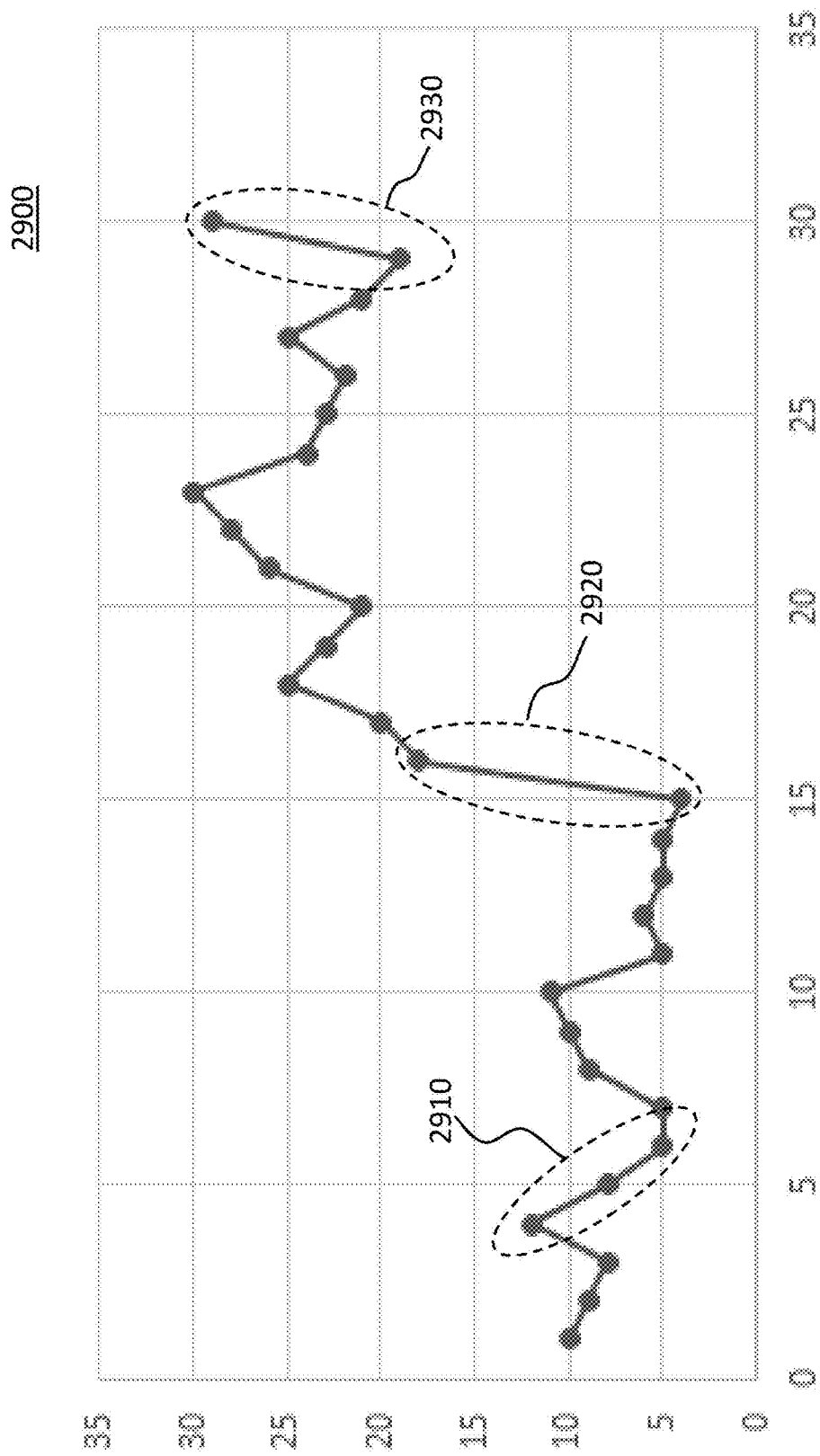
FIG. 29 is graph depicting progression of discussion in the breakout room with respect to a context, in accordance with some embodiments of the disclosure.

FIG. 29 is graph depicting progression of discussion in the breakout room with respect to a context, in accordance with some embodiments of the disclosure. In one embodiment, the control circuitry 504 may plot a graph, such as graph 2900, to show the progress being made within a breakout room. In one embodiment, the progress may be measured by the keywords uttered by the participants and a determination whether the keywords are within the context of the topic. In another embodiment, progress may be determined based on completion of subtopics there are to be discussed in the breakout room. In another embodiment, progress may be measured by participants closing action items or moving forward in determining a plan of action. On the flip side, lack of progress or unproductivity in the breakout conference may be measured by participants interrupting each other, swaying away from the context of the topic, or not completing discussion of subtopics within the allotted time. Other measures of progress may also be defined by the users of the system.

In one embodiment, for every data point in which progress is made, the control circuitry 504 may chart it as an upward movement in the graph. Likewise, for every data point in which progress is not made, the control circuitry 504 may chart it as a negative movement in the graph.

In one embodiment, when a sharp increase or decreases in the graph occurs, the control circuitry 504 may alert the moderator of the room of the sharp increase or decrease. The control circuitry 504 may also determine the reason behind the sharp increase or decrease. For example, at 2910, that decrease may have been caused due to a participant interrupting another participant on a continuous basis or the participant swaying away or getting distracted from the designated topic. There may also be other reasons for the drastic negative movement of the graph, such as a strong disagreement within another participant.

In one embodiment, if the sharp increase or decrease is associated with a particular participant, the control circuitry 504 may take such increases and decreases caused by the participant into account and recalculate the participants score. For example, if a participant was involved in the sudden increase at 2920 and 2930, the control circuitry 504 may detect a pattern where the participant's activity is associated with high productivity or increase in performance at the meeting. As such, the participant's score may be elevated to a higher number.

Figure 30:
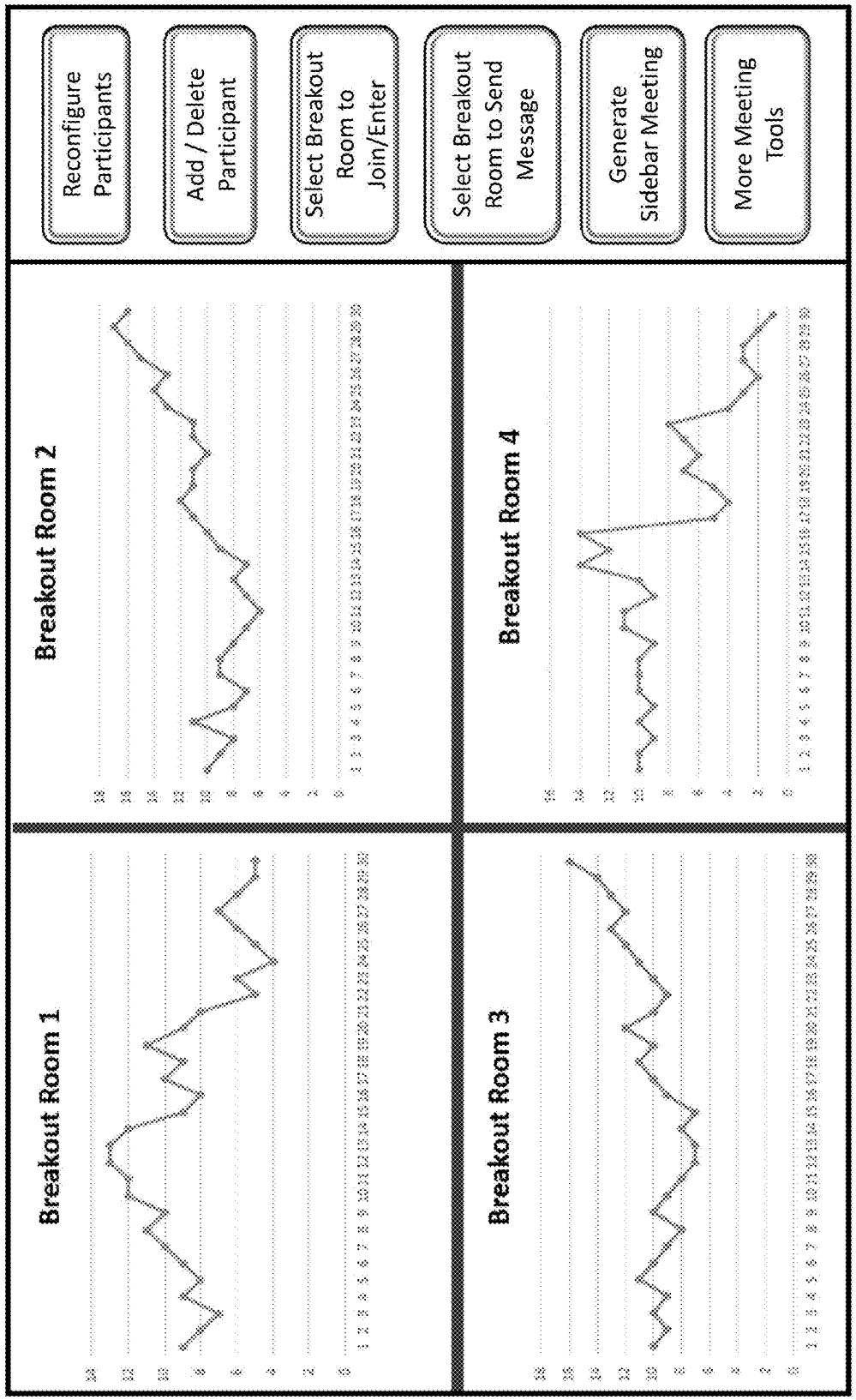
FIG. 30 is user interface for a moderator to monitor a plurality of breakout rooms, in accordance with some embodiments of the disclosure.

FIG. 30 is user interface for a moderator to monitor a plurality of breakout rooms, in accordance with some embodiments of the disclosure. In one embodiment, the control circuitry 504 may cause a display of progress graphs from all breakout rooms on the display of the moderator's user interface 3000. As depicted in FIG. 30, a graph displayed in an application may provide a quick snapshot of how discussions in each breakout room are progressing. For example, discussions in breakout room 1 and breakout room 4 seem to be progressing in a negative and downward manner while discussions in breakout room 2 and breakout room 3 seem to be progressing in a positive and upward manner. The quick snapshot may allow a moderate to allocate their time to the breakout rooms by prioritizing spending time in a breakout room in which needs the moderator's help the most, i.e., a breakout room which is progressing in a negative and downward manner as depicted by its graph.

Figure 31:
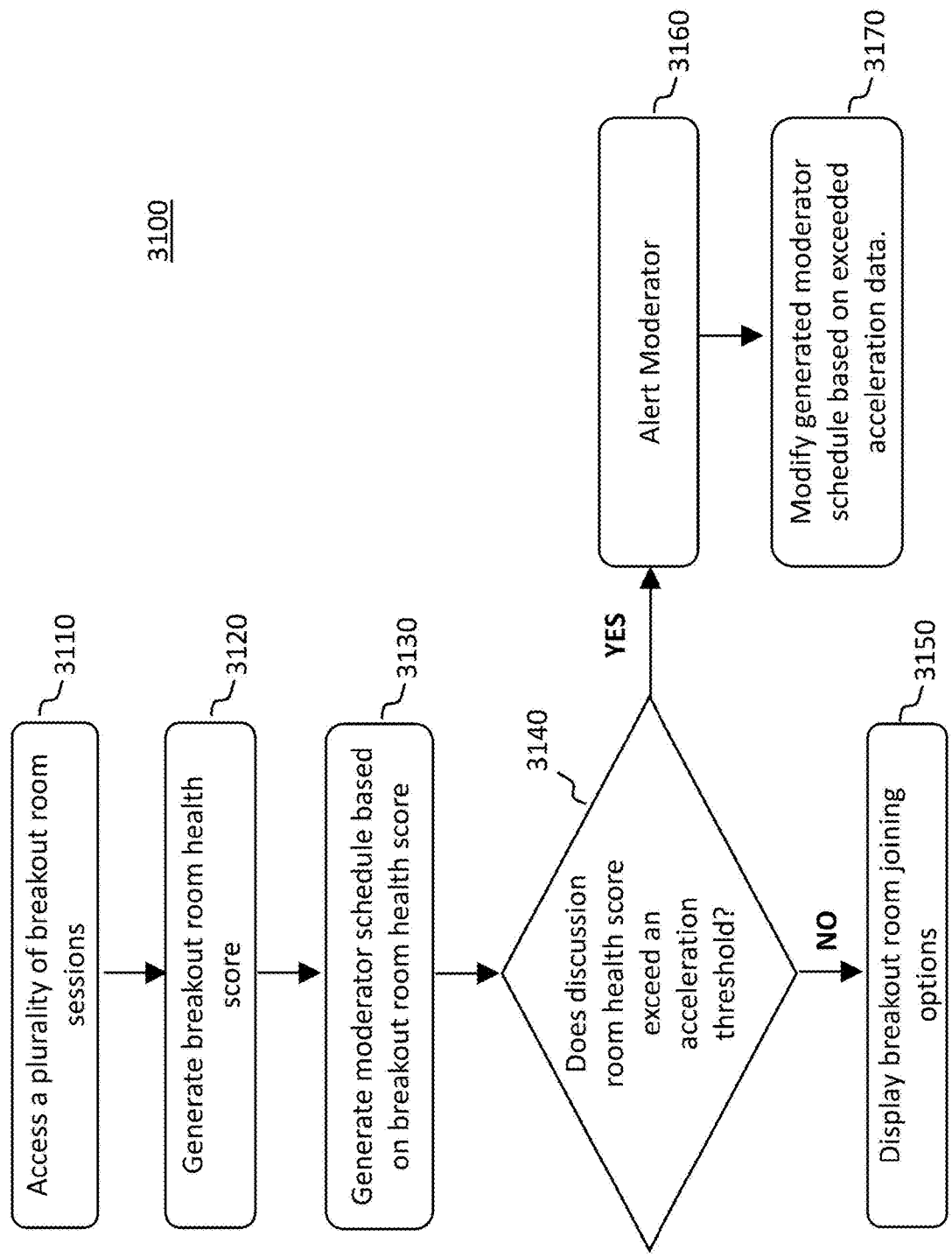
FIG. 31 is flowchart of a process for generating a schedule for the moderator for attending breakout sessions, in accordance with some embodiments of the disclosure.

FIG. 31 is flowchart of a process for generating a schedule for the moderator for attending breakout sessions, in accordance with some embodiments of the disclosure. In one embodiment, the control circuitry 504 at block 3110 may access a plurality of breakout room sessions, such as the breakout room sessions displayed in FIG. 30.

At block 3120, the control circuitry 504 may generate a room health score for each breakout room. The room health score may be associated with the upward or downward movement of progress being made in the breakout room. The room health score may be dynamic and may change in real-time to reflect the most current state of progress in the breakout room. In addition to the room health score, the control circuitry 504 may also plot a graph that is indicative of the room health, as depicted in FIG. 30.

At block 3130, the control circuitry 504 may generate a moderator schedule based on the breakout room health score or breakout room health graph. One such example moderator schedule is displayed in FIG. 32.

At block 3140, the control circuitry 504 may decide whether the room health score, or the graph that represents the room health, exceeds an acceleration threshold. In one embodiment, exceeding an acceleration threshold relates to a sudden spike in the graph or the room health score either in a positive or in a negative direction, such as the spike displayed in 2910, 2920, and 2930 of FIG. 29. In response to determining that the breakout room had its score, or the associated graph exceed an acceleration threshold, then at block 3160, the control circuitry 504 may alert the moderator of such acceleration. The control circuitry 504 may also modify the moderator's schedule at block 3170 such that the moderator may enter the breakout room or prioritize entry to the breakout room that has exceeded the acceleration threshold in the negative direction.

If a determination is made at block 3140 that either the room health score or the associated graph has not exceeded an acceleration threshold, then at block 3150 the control circuitry 504 may display the schedule created at block 3130 and provide breakout room joining options to the moderator.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The invention claimed is:

1. A method comprising:
    establishing, by a computing system, a conference call between a plurality of devices, the conference call comprising at least a first and a second breakout session that are being concurrently held at the same time, from a main conference session, wherein a subset of the plurality of devices are automatically moved from the main conference session to each first and second breakout sessions;
    generating, by the computing system, a moderator's schedule based at least in part on analyzing keywords from voice samples obtained from the plurality of devices connected to each first and second respective breakout sessions that are being concurrently held at the same time;
    generating, by the computing system, a real-time graph that reflects real-time performance in each of the first and second respective breakout sessions, wherein the performance is determined by the computing system based on adherence to an assigned topic for each first and second respective breakout sessions;
    determining, by the computing system, that a downward or negative movement in the real-time graph exceeds an acceleration threshold; and
    modifying, by the computing system without user intervention, the generated moderator's schedule in response to determining the downward or negative movement in the real-time graph related to the second breakout session, wherein the modified moderator's schedule prioritizes the second breakout session over the first breakout session for a moderator device.

2. The method of claim 1, wherein generating the moderator's schedule based at least in part on analyzing keywords from voice samples further comprises:
    analyzing the voice samples using a natural language processing algorithm; and
    calculating a discussion health score for the first and second breakout sessions based on the analyzed voice samples; and
    assigning priority in the generated moderator's schedule based on the calculated discussion health score.

3. The method of claim 1, wherein downward or negative movement in the second breakout session relates to a discussion in the second breakout session that is diverting from an assigned topic.

4. The method of claim 3, further comprising, receiving in the second breakout session, input from the moderator device relating to corrective action for bringing the discussion in the second breakout session back to the assigned topic.

5. The method of claim 1, further comprising, generating a summary of discussion in the first breakout session while the moderator device is connected to the second breakout session.

6. The method of claim 5, further comprising providing the moderator device access to the generated summary of the first breakout session while the moderator device is connected to the second breakout session.

7. The method of claim 6, wherein the generated summary of the first breakout session is available to be accessed in real-time.

8. The method of claim 1, further comprising:
    transmitting, by the computing system, a message from the first breakout session to the moderator device while the moderator device is connected to the second breakout session; and
    receiving, by the computing system, a response to the transmitted message from the moderator device.

9. The method of claim 1, further comprising:
    transmitting, by the computing system, a request from the first breakout session to the moderator device to join the first breakout session while the moderator device is connected to the second breakout session; and
    in response to acceptance of the request, connecting the moderator device that is connected to the second breakout session to the first breakout session.

10. The method of claim 1, further comprising, automatically connecting the moderator device to the second breakout session after modifying the generated moderator's schedule.

11. The method of claim 1, further comprising, transmitting an alert to the moderator device, wherein the alert includes information relating to the downward or negative movement in the second breakout session.

12. A system comprising:
    communication circuitry configured to access a plurality of devices; and
    control circuitry configured to:
        establish a conference call between the plurality of devices, the conference call comprising at least a first and a second breakout session that are being concurrently held at the same time, from a main conference session, wherein a subset of the plurality of devices are automatically moved from the main conference session to each first and second breakout sessions;
        generate a moderator's schedule based at least in part on analyzing keywords from voice samples obtained from the plurality of devices connected to each first and second respective breakout sessions that are being concurrently held at the same time;
        generate a real-time graph that reflects real-time performance in each of the first and second respective breakout sessions, wherein the performance is determined by the computing system based on adherence to an assigned topic for each first and second respective breakout sessions;
        determine that a downward or negative movement in the real-time graph exceeds an acceleration threshold; and
        modify the generated moderator's schedule, without user intervention, in response to determining the downward or negative movement in the real-time graph related to the second breakout session, wherein the modified moderator's schedule prioritizes the second breakout session over the first breakout session for a moderator device.

13. The system of claim 12, wherein generating the moderator's schedule based at least in part on analyzing keywords from voice samples further comprises, the control circuitry configured to:
    analyze the voice samples using a natural language processing algorithm; and
    calculate a discussion health score for the first and second breakout sessions based on the analyzed voice samples; and assign priority in the generated moderator's schedule based on the calculated discussion health score.

14. The system of claim 12, wherein downward or negative movement in the second breakout session relates to a discussion in the second breakout session that is diverting from an assigned topic.

15. The system of claim 14, further comprising, the control circuitry configured to receive in the second breakout session, input from the moderator device relating to corrective action for bringing the discussion in the second breakout session back to the assigned topic.

16. The system of claim 12, further comprising, the control circuitry configured to generate a summary of discussion in the first breakout session while the moderator device is connected to the second breakout session.

17. The system of claim 16, further comprising, the control circuitry configured to provide the moderator device access to the generated summary of the first breakout session while the moderator device is connected to the second breakout session.

18. The system of claim 12, further comprising, the control circuitry configured to:
   transmit a message from the first breakout session to the moderator device while the moderator device is connected to the second breakout session; and
   receive a response to the transmitted message from the moderator device.

19. The system of claim 12, further comprising, the control circuitry configured to:
   transmit a request from the first breakout session to the moderator device to join the first breakout session while the moderator device is connected to the second breakout session; and
   in response to acceptance of the request, connect the moderator device that is connected to the second breakout session to the first breakout session.

20. The method of claim 1, further comprising:
   displaying a conference tool on a user interface of the moderator device, wherein the conference tool allows the moderator device, while attending the second breakout session, to communicate with plurality of devices connected to the first breakout session.

* * * * *